US012567922B2

(12) United States Patent　　(10) Patent No.:　US 12,567,922 B2
Awadin et al.　　　　　　　　　　(45) Date of Patent:　　　Mar. 3, 2026

(54) METHOD AND DEVICE FOR RATE MATCHING FOR MULTICAST AND BROADCAST SERVICES

(71) Applicant: Samsung Electronics Co., Ltd., Gyeonggi-do (KR)

(72) Inventors: Mohamed Mokhtar Gaber Moursi Awadin, Plymouth Meeting, PA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 324 days.

(21) Appl. No.: 17/701,297

(22) Filed: Mar. 22, 2022

(65) Prior Publication Data

US 2022/0360360 A1　　Nov. 10, 2022

Related U.S. Application Data

(60) Provisional application No. 63/182,244, filed on Apr. 30, 2021, provisional application No. 63/225,940, filed on Jul. 26, 2021.

(51) Int. Cl.
　　*H04L 1/00*　　　　(2006.01)
　　*H04B 7/0413*　　(2017.01)
　　*H04L 27/34*　　　(2006.01)
　　*H04W 8/24*　　　(2009.01)
(52) U.S. Cl.
　　CPC .............. *H04L 1/0002* (2013.01); *H04W 8/24* (2013.01); *H04B 7/0413* (2013.01); *H04L 27/34* (2013.01)
(58) Field of Classification Search
　　CPC ....... H04L 1/0002; H04W 8/24; H04B 7/0413
　　See application file for complete search history.

(56) References Cited

U.S. PATENT DOCUMENTS

| | | | | |
|---|---|---|---|---|
| 11,432,278 | B2 * | 8/2022 | Davydov | .............. H04L 5/0044 |
| 11,470,676 | B2 * | 10/2022 | Chen | ...................... H04W 4/06 |
| 2008/0037472 | A1 | 2/2008 | Ryu et al. | |
| 2009/0207773 | A1 | 8/2009 | Feng et al. | |
| 2011/0058511 | A1 | 3/2011 | Kim et al. | |
| 2011/0064016 | A1 | 3/2011 | Kim et al. | |

(Continued)

FOREIGN PATENT DOCUMENTS

| | | | |
|---|---|---|---|
| WO | WO 2021/016588 | 1/2021 | |
| WO | WO-2021016588 A1 * | 1/2021 | ........... H04L 1/0013 |

OTHER PUBLICATIONS

European Search Report dated Sep. 28, 2022 issued in counterpart application No. 22170494.3-1206, 10 pages.

(Continued)

*Primary Examiner* — Parth Patel
(74) *Attorney, Agent, or Firm* — The Farrell Law Firm, P.C.

(57)　　　　　　ABSTRACT

Methods and apparatuses are provided for performing rate matching. A group common-physical downlink shared channel (GC-PDSCH) is received at a user equipment (UE) for communications in a common frequency resource (CFR). An information element that carries configurations for GC-PDSCH transmission in the CFR, is received at the UE. At least one parameter for determining a transport block size (TBS) for the GC-PDSCH transmission in the CFR is determined from at least one field of the information element. The TBS for the GC-PDSCH transmission in the CFR is determined based on the at least one parameter.

21 Claims, 8 Drawing Sheets

(56)        References Cited

U.S. PATENT DOCUMENTS

| | | | |
|---|---|---|---|
| 2019/0141647 A1* | 5/2019 | Nimbalker | H04W 4/40 |
| 2022/0086883 A1* | 3/2022 | Liu | H04W 72/54 |
| 2022/0104232 A1* | 3/2022 | Nimbalker | H04L 27/2607 |
| 2022/0286818 A1* | 9/2022 | Chin | H04W 24/08 |
| 2022/0312318 A1* | 9/2022 | Babaei | H04L 5/0055 |
| 2022/0322130 A1* | 10/2022 | Muruganathan | H04L 5/005 |
| 2022/0329360 A1* | 10/2022 | Lee | H04L 1/1864 |
| 2022/0329364 A1* | 10/2022 | Lee | H04L 1/1861 |
| 2022/0360360 A1* | 11/2022 | Awadin | H04W 8/24 |
| 2022/0361161 A1* | 11/2022 | Wei | H04W 72/046 |
| 2023/0006783 A1* | 1/2023 | Gao | H04L 5/0094 |
| 2023/0062724 A1* | 3/2023 | Zhou | H04L 1/1864 |
| 2023/0097512 A1* | 3/2023 | Yao | H04L 5/0053 |
| | | | 370/329 |
| 2023/0199739 A1* | 6/2023 | Zhou | H04W 72/0453 |
| | | | 370/329 |
| 2023/0413288 A1* | 12/2023 | Liu | H04L 5/0053 |
| 2023/0413295 A1* | 12/2023 | Prasad | H04W 72/0453 |
| 2024/0008025 A1* | 1/2024 | Yoon | H04L 5/0055 |
| 2024/0080141 A1* | 3/2024 | Zhou | H04W 72/30 |
| 2024/0147536 A1* | 5/2024 | Lee | H04L 1/1896 |
| 2024/0154745 A1* | 5/2024 | Lee | H04L 5/0048 |
| 2024/0206011 A1* | 6/2024 | Godin | H04W 76/40 |

OTHER PUBLICATIONS

ETSI TS 138 214 v16.5.0 (Apr. 2021) Technical Specification 5G; NR; Physical layer procedures for data (3GPP TS 38.214 version 16.5.0 Release 16), pp. 173.

ETSI TS 138 331 v16.4.1 (Apr. 2021) Technical Specification 5G; NR; Radio Resource Control (RRC); Protocol Specification (3GPP TS 38.331 version 16.4.1 Release 16), pp. 932.

European Search Report dated Jan. 3, 2025 issued in counterpart application No. 22170494.3-1206, 6 pages.

Qualcomm Incorporated, "View on Group Scheduling for Multicast RRC_Connected UEs", R1-2103186, 3GPP TSG RAN WG1 #104bis, Apr. 12-20, 2021, 8 pages.

Taiwanese Office Action dated May 26, 2025 issued in counterpart application No. 111116235, 9 pages.

* cited by examiner

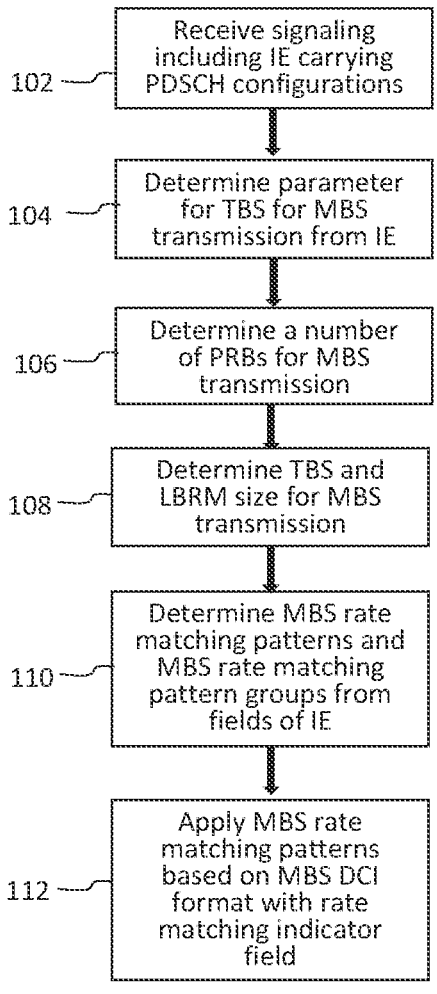

102 — Receive signaling including IE carrying PDSCH configurations

104 — Determine parameter for TBS for MBS transmission from IE

106 — Determine a number of PRBs for MBS transmission

108 — Determine TBS and LBRM size for MBS transmission

110 — Determine MBS rate matching patterns and MBS rate matching pattern groups from fields of IE 112 — Apply MBS rate matching patterns based on MBS DCI format with rate matching indicator field

FIG. 1

202 — Configure at least one field of IE carrying PDSCH configurations for MBS transmission 204 — Configure fields of IE to indicate MBS rate matching patterns and MBS rate matching pattern groups 206 — Transmit RRC signaling including the IE to the UEs Freq.

300

306

304

302

Time

METHOD AND DEVICE FOR RATE MATCHING FOR MULTICAST AND BROADCAST SERVICES

PRIORITY

This application is based on and claims priority under 35 U.S.C. § 119(e) to U.S. Provisional Patent Applications filed in the United States Patent and Trademark Office on Apr. 30, 2021 and Jul. 26, 2021, and assigned Ser. Nos. 63/182,244 and 63/225,940, respectively, the contents of which are incorporated herein by reference.

FIELD

The present disclosure relates generally to multicast and broadcast services (MBS), and more particularly, to parameter alignment and rate matching in MBS.

BACKGROUND

In order to calculate a limited buffer rate matching (LBRM) size, several parameters are needed, such as, for example, a maximum number of layers, a modulation order, and a number of physical resource blocks (PRBs). These parameters are either explicitly signaled through user equipment (UE)-specific signaling, determined based other UE-specific configurations, such as a used modulation and coding scheme (MCS) table, or determined based on UE capability.

Therefore, for proper MBS reception, these parameters should be aligned across all UEs that are in the same MBS group.

An initial MBS physical downlink shared channel (PDSCH) transmission can use a point-to-multipoint (PTM) scheme (e.g., group common (GC)-physical downlink control channel (PDCCH)+GC-PDSCH), while a subsequent retransmission can use a point-to-point (PTP) scheme (e.g., UE-specific PDCCH and UE-specific PDSCH). If two or more LBRMs are used (i.e., one LBRM for unicast transmission and the remaining LBRMs for MBS transmissions), then there will be ambiguity regarding which LBRM should be used when a next generation node B (gNB) uses PTP for MBS retransmission. Specifically, it is unclear whether the initial MBS transmission using the PTM scheme and subsequent MBS retransmissions using the PTP scheme use different LBRM sizes. Such a configuration may be beneficial to increase the chance of successful reception of an MBS transport block (TB). For example, for the initial MBS transmission using the PTM scheme, the MBS LBRM size is considerably smaller than a unicast LBRM size because a common frequency resource (CFR) is smaller than the unicast bandwidth part (BWP) and the gNB may restrict the MBS LBRM size based on the least capable UE in the MBS group. However, for a subsequent MBS retransmission using the PTP scheme, it is unnecessary to use the MBS LBRM. Instead, it may be beneficial to use the unicast LBRM size because it is larger than the MBS LBRM size. Additionally, if two xOverhead values are provided for MBS and unicast, and if the initial MBS transmission uses the PTM scheme and the subsequent MBS retransmission uses the PTP scheme, then it is unclear which xOverhead value should be used for a transport block size (TBS) determination for the MBS retransmission.

For reserved resources that are not available for PDSCH, in legacy new radio (NR), a gNB can configure an identifier of a control resource set (CORESET ID) in a RateMatch- Pattern information element (IE). The UE assumes that all PRBs, which are spanned by this CORESET in all monitoring occasions configured by all search spaces (SSs) associated with this CORESET, are not available for PDSCH reception. Such a framework cannot directly be applied for MBS because different UEs in the same MBS group may be configured with different unicast SSs.

Additional enhancement can be applied for other parameters in the RateMatchPattern IE. For example, in legacy NR, the bitmap indicating PRBs that are not available for PDSCH reception is either interpreted per BWP or per serving-cell. Therefore, it can be enhanced to be per CFR. Also, it may be beneficial to define ratematch group separate from those defined for unicast and introduce their associated downlink control information (DCI) fields. Legacy fallback DCI does not contain a "rate matching indicator" field.

Supporting multiple CFRs or a single CFR with multiple PDSCH configurations (e.g., different time domain resource assignment (TDRA) tables, demodulation reference signal (DMRS) configurations, rate matching patterns, aggregation factors, etc.), is beneficial to support multiple MBS services with different requirements. A UE should determine the CFR or the PDSCH configurations associated with a downlink (DL) assignment provided by MBS PDCCH for dynamic scheduling or for semi-persistent scheduling (SPS). Therefore, the UE must discern the proper CFR or configurations for the reception of MBS PDSCH.

SUMMARY

According to one embodiment, a method is provided for performing rate matching by a UE. A GC-PDSCH is received at the UE for communications in a CFR. An information element that carries configurations for a GC-PDSCH transmission in the CFR, is received at the UE. At least one parameter for determining a TBS for the GC-PDSCH transmission in the CFR is determined from at least one field of the information element. The TBS for the GC-PDSCH transmission in the CFR is determined based on the at least one parameter.

According to one embodiment, a method is provided for performing rate matching by a base station for UEs. A GC-PDSCH is transmitted to the UEs for communications in a CFR. At least one field of an information element, which carries configurations for a GC-PDSCH transmission in the CFR, is configured to determine at least one parameter for determining a TBS for the GC-PDSCH transmission. The information element is transmitted to the UEs.

According to an embodiment, a UE is provided that includes a processor and a non-transitory computer readable storage medium that stores instructions. When executed, the instructions cause the processor to receive a GC-PDSCH for communications in a CFR, and receive an information element that carries configurations for a GC-PDSCH transmission in the CFR. The instructions also cause the processor to determine at least one parameter for determining a TBS for the GC-PDSCH transmission in the CFR from at least one field of the information element. The TBS for the GC-PDSCH transmission in the CFR is determined based on the at least one parameter.

According to one embodiment, a base station is provided that includes a processor and a non-transitory computer readable storage medium that stores instructions. When executed, the instructions cause the processor to transmit a GC-PDSCH for communications in a CFR, and configure at least one field of an information element, which carries configurations for a GC-PDSCH transmission in the CFR, to determine at least one parameter for determining a TBS for the GC-PDSCH transmission in the CFR. The instructions also cause the processor to transmit the information element.

BRIEF DESCRIPTION OF THE DRAWINGS

The above and other aspects, features, and advantages of certain embodiments of the present disclosure will be more apparent from the following detailed description, when taken in conjunction with the accompanying drawings, in which:

FIG. 1 is a flowchart illustrating a method for determining TBS and LBRM, and performing rate matching by a UE in an MBS group, according to an embodiment.

DETAILED DESCRIPTION

Figure 2:
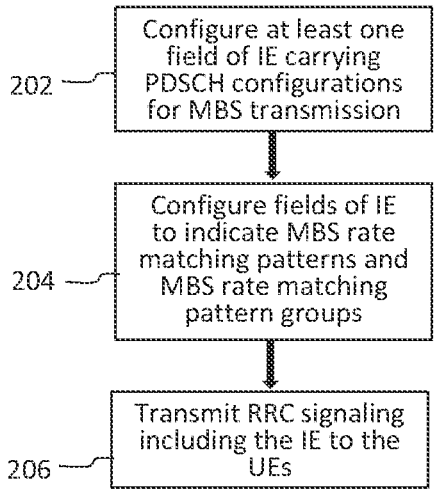
FIG. 2 is a flow chart illustrating a method for determining TBS and LBRM, and performing rate matching by a base station for UEs in an MBS group, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Embodiments of the disclosure ensure alignments between UEs in the same MBS group when determining the TBS/LBRM and the unavailable resource elements (REs) used for reception of an MBS initial transmission that is scheduled by a PTM scheme or a retransmission that is scheduled by either a PTM or PTM scheduling scheme.

LBRM size is calculated as described in 3$^{rd}$ Generation Partnership Project (3GPP) Technical Specification (TS) 38.212 Error! Reference source not found, and 38.214 Error! Reference source not found. Specifically, the LBRM size is set forth as $N_{cb}=\min(N, N_{ref})$, where N is the number of encoded bits, $N_{ref}$ is given by $$N_{ref} = \left\lfloor \frac{TBS_{LBRM}}{C \cdot R_{LBRM}} \right\rfloor,$$

$R_{LBRM}=\frac{2}{3}$, and C is the number of code blocks.

To calculate $TBS_{LBRM}$, the procedure for TBS determination in Clause 5.1.3.2 of 3GPP TS 38.214 Error! Reference source not found, is applied, but some of the parameters required for TBS determination are specified in Clause 5.4.2.1 in 38.212 Error! Reference source not found, rather than being indicated.

In determining the TBS, the UE first determines the number of resource elements (REs) ($N_{RE}$) within a slot, as set forth below.

The UE determines the REs allocated for a PDSCH within a PRB ($N'_{RE}$) by $N'_{RE}=N_{SC}^{RB} \cdot N_{symb}^{sh}-N_{DMRS}^{RMB}-N_{oh}^{PRB}$. $N_{SC}^{RB}=12$ is the number of subcarriers in a PRB. Ns, is the number of symbols of the PDSCH allocation within the slot. $N_{DMRS}^{RMB}$ is the number of REs for DMRS per PRB in the scheduled duration including the overhead of the DM-RS code division multiplexing (CDM) groups without data, as indicated by DCI format 1_1 or format 1_2, or as described for format 1_0 in Clause 5.1.6.2. $N_{oh}^{PRB}$ is the overhead configured by higher layer parameter xOverhead in PDSCH-ServingCellConfig. If the xOverhead in PDSCH-Serving-Cellconfig is not configured (e.g., as a value from 6, 12, or 18), the $N_{oh}^{PRB}$ is set to 0. If the PDSCH is scheduled by PDCCH with a cyclic redundancy check (CRC) scrambled by system information (SI)-radio network temporary identifier (RNTI), random access (RA)-RNTI, message B (MSGB)-RNTI, or paging (P)-RNTI. $N_{oh}^{PRB}$ is assumed to be 0.

As described above, the UE determines the number of allocated REs within a single PRB. The total number of REs within that allocated for the PDSCH is given by $N_{RE}=\min$ (156, $N'_{RE}$), $n_{PRB}$, where $n_{PRB}$ is the total number of allocated PRBs for the UE.

In determining the TBS, the UE next determines unquantized intermediate variable $N_{info}$ using $N_{info}=N_{RE} \cdot R \cdot Q_m \cdot v$, where $N_{RE}$ is calculated as in the previous step, R is the target code rate, $Q_m$ is the modulation order, and v is the number of layers.

When $N_{info} \leq 3824$, the TBS is determined as the closest TBS from Table 5.1.3.2-1 in 3GPP TS 38.214 to $N'_{info}$, which is given by $$N'_{info} = \max\left(24, 2^n \cdot \left\lfloor \frac{N_{info}}{2^n} \right\rfloor\right),$$

where n=max(3, $\lfloor \log_2 N_{info} \rfloor$−6).

When $N_{info}>3824$, the TBS is determined by an equation that is function of $N_{info}$ and R, as in Clause 5.1.3.2.

Accordingly, TBS determination depends on the number of allocated REs for PDSCH, which is function of the number of allocated PRBs, symbols, configured DMRS, and the indicated overhead value. The TBS determination also depends on the coding rate, the modulation order, and the number of layer.

For $TBS_{LBRM}$ determination, the first step in the aforementioned procedure is not applied, and instead, $N_{RE}$ is directly given by $N_{RE}=156 \cdot n_{PRB}$, where $n_{PRB}$ is determined based on a maximum number of PRBs across all configured DL BWPs, rather than the number of PRBs allocated to PDSCH as in the first step above.

In order to determine $TBS_{LBRM}$, the number of layers, the modulation order, the coding rate, and the number of PRBs are specified. The maximum number of multiple input-multiple output (MIMO) layers is min(X, 4). X is given by maxMIMO-Layers in PDSCH-ServingCellConfig, which are UE-specific configurations applied across all BWPs configured for that UE. Otherwise, the maximum number of layers is determined based on UE capability. The modulation order is set to $Q_m=8$, if mcs-Table is set to "qam256" (quadrature amplitude modulation (QAM)). Otherwise, the modulation order is set as $Q_m=6$. The number of PRBs is determined as the maximum number of PRBs across all configured DL BWPs.

Herein, the term "PDSCH-config for MBS" is used to refer to the IE that is used to carry the PDSCH configurations of MBS.

Since the MBS PDSCH is transmitted to multiple UEs, it is important that all UEs receiving the same MBS PDSCH have a common understanding of LBRM.

As described above, several parameters are used in the calculation of $TBS_{LBRM}$, which in turn is used to calculate LBRM size. To ensure that all UEs in an MBS group derive the same $TBS_{LBRM}$, the following parameters should be aligned between the UEs in the same MBS group.

The first parameter is the maximum number of MIMO layers. As described above, this parameter is given by min (X, 4), where X is given by maxMIMO-Layers of PDSCH-ServingCellConfig. Otherwise, X is given by the maximum number of layers for PDSCH supported by the UE for the serving cell.

A field, maxMIMO-Lavers, may be provided in the PDSCH-config for MBS. If this field were absent, each UE in the MBS group may determine the parameter differently based on its capability, which results in discrepancy in the calculations of $TBS_{LBRM}$.

Alternatively, when maxMIMO-Layers is not provided in the PDSCH-config for MBS, the maximum number of layers used for $TBS_{LBRM}$ calculation may be predefined (e.g., provided in the specs) regardless of UE capabilities. For example, the maximum number of layers may be set equal to 4 or 1.

Moreover, if the maxMIMO-Lavers is not configured in PDSCH-config for MBS, the UE may apply maxMIMO-Layers configured for unicast BWP associated with the CFR. Thus, it is the responsibility of the gNB to ensure that all UEs in the same MBS group are configured with the same maxMIMO-Layers.

The second parameter involved in the calculation of $TBS_{LBRM}$ is the modulation order. As described above, the maximum modulation order is equal to 8 if mcs-Table is set to 'qam256' on any DL BWP. Otherwise, the maximum modulation order is equal to 6.

The maximum modulation order is determined based the configured mcs-table for PDSCH-config for MBS, independent of the configured mcs-table for the associated unicast BWP or any other BWPs.

Specifically, if mcs-table in PDSCH-config for MBS is 'qam256', the maximum modulation order is equal to 8, otherwise the maximum modulation order is equal to 6. Also, the MBS mcs-table may be a field in PDSCH-config for MBS.

Alternatively, the maximum modulation order for MBS $TBS_{LBRM}$ calculations can be predefined (e.g., provided in the specs). For example, the maximum modulation order may be equal to 6 independent of the configured mcs-table in PDSCH-config for MBS or the associated BWP or any other BWP. This may be beneficial for the broadcast case.

If mcs-able is not configured in PDSCH-config for MBS (e.g., in the case in which mcs-table for unicast BWP is used), then the UE determines the maximum modulation order for MBS $TBS_{LBRM}$ calculations based on this configured mcs-table for the associated unicast BWP, but not any other BWP. For example, the maximum modulation order is equal to 8 if mcs-Table is set to 'qam256' on DL BWP associated with CFR. Otherwise, when mcs-table is not configured in PDSCH-config for MBS, the maximum modulation order is set equal to 6 which is the equivalent of assuming the usage of Table 5.1.3.1-1 in 38.214. It is the responsibility of the gNB to ensure that all UEs in the same MBS group have a common understanding of which MCS table should be applied. This can be realized by configuring the same MCS table for the unicast BWPs of all UEs in the MBS group. However, this should be independent of mcs-table configured for other BWPs.

If the mcs-table is not configured in PDSCH-config for MBS, the UE determines the maximum modulation order for MBS $TBS_{LBRM}$ calculations based on the configured MCS table of the associated unicast BWP.

The third parameter used to calculate $TBS_{LBRM}$ is the number of PRBs. As described above, the number of PRBs used for $TBS_{LBRM}$ is determined based on the maximum number of PRBs across all configured DL BWPs. This may create misalignment between UEs in the same MBS group because they may be configured with DL BWPs of different sizes. We propose that $n_{PRB} = n_{PRB,LBRM}^{MBS}$ for MBS $TBS_{LBRM}$ calculations, where $n_{PRB,LBRM}^{MBS}$ is determined based on a size of the CFR independent of the associated unicast BWP, as shown in Table 1 below, for example.

If the CFR is not configured and MBS PDSCH can be received in an entire unicast BWP, $n_{PRB,LBRM}^{MBS}$ is determined based on the number of PRBs in this BWP, independent of the number of PRBs of other configured BWPs.

8

TABLE 1

| Number of PRBs of CFR | $n_{PRB, LBRM}^{MBS}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

If the UE is configured with multiple CFRs or configured to receive multiple MBS services with different configurations within the same CFR, multiple $TBS_{LBRM}(s)$ may be determined for each CFR or each MBS service based on the associated configurations for each CFR or MBS service, as described above.

For each CFR, a dedicated $TBS_{LBRM}$ can be determined.

UEs may also receive a multicast or broadcast in an RRC idle/inactive state, to which the aforementioned solutions may also be applied. In legacy NR, the determination of the number of PRBs is based on the number of PRBs of an initial BWP. Therefore, for the case of MBS $TBS_{LBRM}$ calculation in RRC idle/inactive, the number of PRBs of configured CFR should be used instead of the initial BWP. If the CFR is not configured, the initial BWP may be used.

If the RRC idle/inactive UE is configured with multiple CFRs or configured to receive multiple MBS services with different configurations within the same CFR, multiple $TBS_{LBRM}$ may be determined for each CFR or each MBS service based on the associated configurations for each CFR or MBS service as described above.

In NR, the gNB can reserve time-frequency resources and label them as not available for PDSCH reception. Such a reservation can be statically configured by higher layer signaling or dynamically indicated in the DCI through a 'Rate matching indicator' field.

For the above-described dynamic indication, the gNB can configure the UE with two groups of rate matching patterns and select any of them using the DCI. To this end, rateMatchPatternGroup1 and rateMatchPatternGroup1 DCI-1-2 are used to indicate the IDs of RateMatchPatterns that compose the first group when using DCI 1_1 or DCI 1_2, respectively. Similarly, rateMatchPatternGroup2 and rateMatchPatternGroup2DCI-1-2 are constructed.

When the DCI activates group 1 or group 2, the UE applies rate matching around a union of the resources configured by RateMatchPattern(s) whose ID(s) are included in the activated group. It is possible for both groups to be activated simultaneously.

In each RateMatchPattern IE, the gNB can provide the UE with the reserved resources in the time and frequency domains.

The gNB can provide the reserved resources in the frequency domain through a bitmap (by RRC parameter resourceBlocks) to indicate the reserved PRBs. It can be interpreted as per BWP or per serving-cell. If rateMatch-PatternToAddModList is given by PDSCH-Config, then this bitmap is interpreted as per BWP. However, if rateMatch-PatternToAddMoDList is given by ServingCellConfg or by ServingCellConfigCommon, then this bitmap is interpreted as per serving-cell.

The gNB an provide the reserved resources through PRBs spanned by a particular CORESET in all monitoring occasions configured by all search-space-sets associated with this CORESET.

The gNB can provide the reserved resources in the time domain through another two bitmaps to indicate the associated time domain positions of the reserved PRBs. One RRC parameter (symbolsInResourceBlock) indicates which symbols within one or two slots have reserved PRBs. Another RRC parameter (periodicityAndPattern) indicates the periodicity and pattern of the reserved PRBs.

The determination of TBS size is a function of several parameters reflecting PDSCH allocation details, such as, for example, the number of allocated OFDM symbols, PRBs, number of REs for DMRS, and the indicated MCS. In addition to these parameters, the UE can also account for the overhead from channel state information (CSI)-reference signal (RS), CORESET, etc., when it is configured by xOverhead. Otherwise, the overhead is assumed to be 0. In legacy NR, xOverhead is configured in the UE-specific PDSCH-SevingCellConfig IE, which makes it common across all UE's unicast BWPs.

To ensure that all UEs in the same MBS group derive the same TBS, another overhead parameter may be configured for MBS by the gNB. For example, MBS-xOverhead can be configured in PDSCH-config for MBS. The MBS-xOverhead is independent of the legacy xOverhead parameter in PDSCH-SevingCellConfig.

If the overhead parameter for MBS (e.g., MBS-xOverhead) is not configured, the UE may assume that the overhead value for the determination of MBS TBS is 0, even if xOverhead for unicast PDSCH is configured. In this scenario, even if the overhead parameters for both unicast and MBS are equal, they are signaled separately.

In order to reduce signaling overhead when the overhead parameters of unicast and MBS are equal, if the overhead parameter for MBS (e.g., MBS-xOverhead) is not configured, the UE may apply the overhead parameter of unicast, if configured. Specifically, the MBS overhead parameter is only signaled when it differs from the unicast overhead parameter.

Thus, when the MBS overhead parameter is not configured, the UE may either assume zero overhead for MBS TBS determination, or apply the same overhead value of unicast.

For MBS, the initial transmission can be scheduled by GC-PDCCH of the PTM scheme and can be scheduled in the configured CFR. The subsequent retransmissions may be scheduled using the PTP scheme, where both PDCCH and PDSCH are UE-specific. The subsequent retransmissions using the PTP scheme can be allocated anywhere in the unicast BWP, and are not only limited to the CFR.

In the initial transmission, the UE may apply the MBS overhead parameter, as described above. However, for the subsequent retransmission using the PTP scheme, the UE can apply the overhead parameter of either MBS or unicast.

Accordingly, the UE may always apply the MBS overhead parameter for both the initial transmission and subsequent retransmissions, regardless of whether these retransmissions are scheduled with PTM scheme 1/2 or the PTP scheme.

However, using the MBS overhead parameter for subsequent MBS retransmissions using the PTP scheme (that can be transmitted anywhere in the unicast BWP) may not necessary reflect the real overhead level in the unicast BWP. For example, the UE may use the unicast overhead parameter, provided by xOverhead parameter in PDSCH-SevingCellConfig, to determine the TBS whenever the subsequent retransmissions are scheduled using the PTP scheme. On the other hand, the UE uses the MBS overhead parameter for TBS determination of the initial MBS transmission by PTM scheme 1/2.

Thus, the UE may apply the unicast overhead parameter for TBS determination when the subsequent MBS retransmissions are scheduled by the PTP scheme, while applying the MBS overhead parameter for the initial transmission.

The UE may determine the overhead parameter for TBS determination for MBS retransmissions scheduled by the PTP scheme as a function of the overhead parameter of MBS and unicast, when both are configured. For example, the overhead parameter may be equal to min (unicast overhead parameter, MBS overhead parameter) or max (unicast overhead parameter, MBS overhead parameter).

The overhead parameter for MBS TBS determination can be a function of the overhead parameter of unicast and MBS.

To provide the gNB with more flexibility, the gNB may indicate to the UE which overhead parameter should be applied for MBS retransmissions when they are scheduled by the PTP scheme. This indication may be dynamically transmitted in the scheduling DCI by introducing a field indicating the overhead parameter to be applied. For example, a 1-bit field may indicate either the MBS overhead parameter or the unicast overhead parameter to be applied when both are configured. Alternatively, the gNB can configure the UE with a set of possible overhead values to be applied and a DCI field can indicate one of them.

The gNB may indicate the value of the overhead parameter to be applied through a MAC-CE. The indicated overhead value may be applied until the reception of another MAC-CE indicating a new overhead value. Also the indicated overhead value may be applied for a certain period of time that is configured through higher layer signaling. At the end of this period, the UE may apply a default overhead parameter that may be the overhead parameter of either unicast or MBS.

Thus, the overhead parameter to be applied can be indicated either dynamically through the scheduling DCI, or semi-statically through MAC-CE.

Although the aforementioned solutions are described with respect to an initial transmission scheduled by PTM scheme 1/2, these solutions can also be applied for SPS. For the initial MBS PDSCH transmission in an SPS occasion, the UE uses the MBS overhead parameter for TBS determination. For subsequent retransmissions scheduled using the PTP scheme, the UE may apply any of the aforementioned procedures to determine the overhead parameter to be applied for TBS determination.

Thus, for SPS MBS, the TBS determination of the initial transmission applies the overhead parameter of MBS, which can differ from the overhead parameter used for retransmissions using the PTP scheme.

The following solutions may be applied for determining which LBRM (unicast LBRM or MBS LBRM) is to be applied when MBS retransmissions use the PTP scheme, but PTM scheme 1/2 is used for the initial MBS transmission. The solutions in general are similar to those developed for calculating TBS in the similar situation.

The UE may assume an MBS LBRM size for both the initial MBS transmission and subsequent retransmissions regardless which transmission schemes are used. Specifically, if PTM scheme 1/2 is used to schedule the initial MBS transmission and the PTP scheme is used to schedule the retransmission(s), the UE may assume the same LBRM size used for MBS initial transmission. This solution will simplify the scheduling as the TB will be written in the circular buffer only once.

The UE may assume a unicast LBRM size for the MBS retransmissions when they are scheduled by the PTP scheme. This may be beneficial if the MBS LBRM size is smaller than the unicast LBRM size. In this situation, more information bits (e.g., systematic bits) can be transmitted when in the MBS retransmission when scheduled using the PTP scheme. This benefit comes at the cost that a TB needs to be written in two LBRMs. One of the two LBRMs is an MBS LBRM and to be used in the initial transmission. The other of the two LBRMs is a unicast LBRM to be used for subsequent retransmissions when scheduled using the PTP scheme.

Alternatively, the LBRM size assumed for MBS retransmissions when scheduled using the PTP scheme can be determined as a function of the unicast LBRM size and the MBS LBRM size. For example, it may be equal to the min (unicast LBRM size, MBS LBRM size) or max (unicast LBRM size, MBS LBRM size).

Moreover, the gNB may dynamically, semi-statically, or statically indicate which LBRM size should be applied for MBS retransmissions when scheduled using the PTP scheme. The UE-specific DCI scheduling the MBS retransmissions may indicate which LBRM size should be applied. For example, a 1-bit field may indicate either MBS LBRM or unicast LBRM to be applied. Also, the gNB may use the MAC-CE to indicate which LBRM size should be applied when MBS retransmissions are scheduled using the PTP scheme. Also, the gNB may configure the UE through higher layer signaling, such as the RRC parameter, with which LBRM size should be used.

For both LBRM and TBS determination, whether the same or different configurations are applied across the initial MBS transmission (using PTM scheme 1/2) and subsequent retransmissions (using the PTP scheme) can depend on UE capability. For example, the UE may indicate (e.g., as part of its capabilities report) that the LBRM size or the overhead parameter may differ between the initial MBS transmission (using PTM scheme 1/2) and subsequent retransmissions (using the PTP scheme).

The aforementioned solutions can also be applied to the case in which multiple CFRs or multiple MBS services are configured.

For the determination of the LBRM for retransmission of an MBS scheduled by the PTP scheme, similar procedures to those developed for the TBS determination can be applied.

Another method to handle the LBRM for retransmission of MBS scheduled by the PTP scheme is that the UE does not expect the MBS LBRM and the unicast LBRM to have different sizes. It is up to the gNB to determine how to ensure that MRS LBRM and the unicast LBRM have the same size.

In order to avoid putting restrictions in LBRM for regular unicast, LBRM may be defined for the PTP scheme that differs from LBRM for regular unicast. The LBRM for the PTP scheme may have the same size as that of LBRM for MBS used with PTM scheme 1/2. Accordingly, MBS LBRM is used for both an initial transmission using PTM scheme 1/2 and subsequent retransmissions using the PTP scheme.

In the case of multiple CFRs or MBS services configured and associated with different LBRM sizes, the DCI of PTP scheduling MBS retransmission may be used to indicate which LBRM should be applied. This is beneficial if the UE misses the initial transmission scheduled by PTM scheme 1/2. This indication may be in a form of a new field indicating the CFR or MBS service index associated with the corresponding retransmission.

The UE may also construct an ordered list of different calculated LBRMs, as set forth below in Table 2, which begins with unicast LBRM, followed by MBS for CFRs in their ascending indices. PDCCH of PTP scheduling retransmission of MBS may indicate the index of the LBRM to be applied.

TABLE 2

| Index | LBRM type |
| --- | --- |
| 0 | Unicast LBRM |
| 1 | MBS LBRM for CFR 0 |
| 2 | MBS LBRM for CFR 1 |
| 3 | MBS LBRM for CFR 2 |

PTP can also be used for scheduling an initial MBS transmission. In this case, the above-described solution to determine TBS and LBRM may also be applied. For example, the UE may assume unicast LBRM is used, and use the unicast overhead parameter to determine the TBS.

Any solution developed for TBS determination may be applied for LBRM determination and vice versa.

Based on current specs, the gNB can configure up to 4 RateMatchPattern(s) per BWP and up to 4 per serving-cell. It is beneficial to ensure that all UEs in the same MBS group have a common understanding of the REs that are not available for MBS PDSCH within the CFR. Therefore, the gNB configures several RateMatchPattern(s) that are fully confined within the CFR and to be indicated as part of PDSCH-config for MBS to be common among all UEs in the same MBS group. To avoid impacting unicast, the number RateMatchPattern(s) that can be configured per BWP or serving-cell are increased. For example, up to 2 RateMatchPattern(s) can be configured per CFR, up to 6 RateMatchPattern(s) can be configured per BWP, and up to 6 RateMatchPattern(s) can be configured per serving cell.

If the UE is configured with multiple CFRs, the number of RateMatchPattern(s) per BWP or per serving cell is increased to accommodate the RateMatchPattern(s) to be configured per CFR. For example, if n CFRs are configured with each one having up m RateMatchPattern(s), then the number of RateMatchPattern(s) per BWP may be n·m+4 per BWP and n·m+4 per serving-cell.

In current specs, to facilitate dynamic indication of the unavailable REs for PDSCH, rateMatchPatternToAddModList, rateMatchPattenGroup1, rateMatchPatternGroup2, rateMatchPatternGroup1 DCI-1-2 and rateMatchPatternGroup2DCI-1-2 can be configured. Two additional groups can be configured for MBS PDSCH scheduled by PTM scheme 1/2. For example, rateMatchPatternToAddModList, MBS-rateMatchPatternGroup1 and MBS-rateMatchPatternGroup2 can be configured as part of PDSCH-config for MBS.

Two DCI formats are supported for MBS scheduling or activating MBS SPS. One of the DCI formats may not include 'Rate matching indicator' field, while the other may include a 'Rate matching indicator' field. The bits of the field may be interpreted in the same way as in unicast, but with respect to MBS rate matching group (e.g., MBS-rateMatchPatternGroup1 and MBS-rateMatchPatternGroup2, instead of rateMatchPatternGroup1 and rateMatchPatternGroup2).

With different RateMatchPattern(s) per BWP, serving-cell, or CFR, and with different rate matching groups, it is important to define which one is to be applied and when.

Table 3, set forth below, exemplifies UE behavior with respect to different RateMatchPattern configurations. Table 3 assists in avoiding the application of rate matching patterns configured for unicast when receiving MBS PDSCH in the CFR because different UEs in the MBS group may have different unicast configurations. On other hand, for unicast PDSCH reception, the UE has to consider at least MBS rate matching patterns (e.g., MBS-RateMatchPattern), that are not included in any MBS rate matching groups (e.g., MS-rateMatchPattenGroup1 or MBS-rateMatchPatternGroup2).

Although in

Table 3, for MBS PDSCH, the UE should not apply the unicast rate matching patterns, RateMatchPattern(s), that are not included in any unicast rate matching groups (e.g., rateMatchPatternGroup1(DCI-1-2) or MBS-rateMatchPatternGroup2(DCI-1-2)), they may be applied for the reception of MBS PDSCH. For example, the unicast RateMatch-Pattern(s) configured on the cell or BWP level may be applied for MBS PDSCH as well.

different UEs in the same MBS group. Specifically, the CORESET may be associated with different unicast search space sets for different UEs in the same MBS group.

For MBS RateMatchPattern configured in PDSCH-Config for the MBS or indicated to be applied for MBS by higher layer signaling, when controlResourceSet is configured, all PRBs spanned by this CORESET in all monitoring occasions indicated by common search space sets associated with this COREST are not available for MBS PDSCH. These common search space sets may only be searched for MBS. However, it can also include other common search spaces.

If a unicast search space is supported for scheduling MBS using PTM scheme 1, when controlResourceSet configured,

TABLE 3

| | Unicast PDSCH scheduled/ activated by DCI 1_0 | Unicast PDSCH scheduled/ activated by DCI 1_1, 1_2 | MBS PDSCH scheduled/ activated by first DCI format | MBS PDSCH scheduled/ activated by second DCI format |
| --- | --- | --- | --- | --- |
| Unicast RateMatchPattern(s) that are provided in PDSCH-Config, ServingCellConfig or ServingCellConfigCommon and are not included in either of the unicast two groups | Always applied | Always applied | Not applied | Not applied |
| Unicast rate matching groups: rateMatchPatternGroup 1(DCI-1-2) or rateMatchPatternGroup 2(DCI-1-2) | Always applied | Only applied when the corresponding bit in 'Rate matching indicator' field is equal to 1 | Not applied | Not applied |
| MBS RateMatchPattern(s) that are provided in PDSCH-Config for MBS and are not included in either of the MBS two groups | Always applied | Always applied | Always applied | Always applied |
| MBS rate matching groups: MBS-rateMatchPatternGroup 1 or MBS-rateMatchPatternGroup 2 | Always applied | Not applied | Always applied | Only applied when the corresponding bit in 'Rate matching indicator' field is equal to 1 |

Note:
the term "applied" means that REs indicated by RateMatchPattern(s) are not available for PDSCH.

Within the unicast RateMatchPattern IE, the resource-Blocks parameter is a bitmap of 275 bits indicating the unavailable RB for PDSCH reception. If RateMatchPattern is configured in PDSCH-Config for MBS or is indicated to be applied for MBS by higher layer signaling, such as, for example, RRC parameter usage that can be set MBS, the size of resourceBlocks can be reduced. For example, the bitmap size may be equal to the number of PRBs allocated for CFR if configured. Otherwise, the bitmap size may be equal to the number of PRBs allocated for BWP where the MBS will be received. When the CFR is configured, the bitmap is interpreted relative CFR, where first/left most bit corresponds to the first PRB in the CFR and so on.

Another parameter in the RateMatchPattern IE is control-ResourceSet. When configured, all PRBs spanned by this CORESET in all monitoring occasions indicated by all search space sets associated with this COREST are not available for PDSCH. This may create discrepancy in defining the REs that are not available for MBS PDSCH between all PRBs spanned by this CORESET in all monitoring occasions, which are indicated by common search space sets or unicast search space sets for the MBS associated with this CORESET, are not available for PDSCH.

The controlResourceSet parameter in RateMatchPattern for MBS defines the REs that are not available for MBS PDSCH, which are spanned by the indicated CORESET in all monitoring occasions of all associated with a common search space (e.g., an MBS common search space), and/or any search space used for scheduling MBS with PTM scheme 1 including unicast search space, if supported.

It may be beneficial to support configuring rate matching patterns for UEs in RRC idle/inactive states receiving the MBS. Such configurations may be similar to the framework of RRC connected UEs. However, such configurations may be carried in remaining minimum system information (RMSI), other system information (OSI), or a multicast control channel (MCCH). If rate matching pattern groups are defined for RRC idle/inactive UEs, it may follow the same framework as for RRC connected UEs receiving the MBS. The indication of which rate matching pattern group should be applied may be carried in the DCI scheduling MBS PDSCH, or in MCCH.

FIG. 1 is a flowchart illustrating a method for performing rate matching by a UE in an MBS group. The UE receives an MBS transmission and a unicast transmission. The MBS transmission includes PDCCH and a PDSCH for communications in a CFR. At 102, the UE receives RRC signaling including an IE that carries PDSCH configurations for an MBS transmission.

At 104, at least one parameter for determining a TBS for the MBS transmission is determined from at least one field of the IE. The at least one parameter includes at least one of a maximum number of layers, a modulation order, and an overhead parameter for the MBS transmission. When the at least one field of the IE is not configured to determine the maximum number of layers, the maximum number of layers is predefined and provided in the specifications. When the at least one field of the information element is not configured to determine the mcs-table, the modulation order is set to a default modulation order value provided in the specification. When the at least one field of the IE is not configured to determine the overhead parameter, the overhead parameter is set to a default overhead value provided in the specifications.

At 106, a number of PRBs for the MBS transmission are determined. The number of PRBs are determined based on a size of the CFR when the CFR is configured, and are determined based on a size of a BWP containing the MBS transmission when the CFR is not configured.

At 108, the TBS and the size of LBRM are determined for the MBS transmission based on the at least one parameter and the number of PRBs.

At 110, one or more MBS rate matching patterns and one or more MBS rate matching pattern groups are determined from one or more fields of the IE. At 112, rate matching patterns are applied from the one or more MBS rate matching patterns and the one or more rate matching pattern groups, based on a received MBS DCI format with a rate matching indicator field.

FIG. 2 is a diagram illustrating a method for performing rate matching by a base station for UEs in an MBS groups. At 202, at least one field of an IE, which carries PDSCH configurations for an MBS transmission, is configured to determine at least one parameter for determining TBS for the MBS transmission. The MBS transmission includes as PDCCH and a PDSCH for communications in a CFR.

The at least one parameter includes at least one of a maximum number of layers, a modulation order, and an overhead parameter for the MBS transmission. When the at least one field of the IE is not configured to determine the maximum number of layers, the maximum number of layers is predefined and provided in the specifications. When the at least one field of the information element is not configured to determine the mcs-table, the modulation order is set to a default modulation order value provided in the specifications. When the at least one field of the IE is not configured to determine the overhead parameter, the overhead parameter is set to a default overhead value provided in the specifications.

At 204, one or more fields of the IE are configured to indicate one or more MBS rate matching patterns and one or more rate matching pattern groups. At 206, RRC signaling including the IE is transmitted to the UEs.

As described above, all UEs in the same MBS group will have the same understanding of TBS/LBRM used for MBS PDSCH in CFR based on the MBS configurations. In case of an absence of MBS configurations, a set of default values are defined to ensure that all UEs have a common understanding of TBS/LBRM for MBS. In case of an initial transmission by a PTM scheduling scheme followed by a retransmission by a PTP scheduling scheme, several schemes are provided to determine whether unicast TBS/LBRM or multicast TBS/LBRM is to be applied. Since dedicated rate matching patterns can be configured within CFR for MBS and they can differ from the unicast rate matching patterns, the applicability of different configured rate mattering patterns is determined. Schemes to indicate the unavailable REs require fewer bits to indicate the unavailable RBs.

In NR, UE-specific PDSCH configurations are provided through PDSCH-ServingCellConfig IE and PDSCH-Config IE. The former is used to provide the UE with the common configurations to be used across all of the UE's configured BWPs of one serving cell. This includes configurations related to a code-block-group (CBG), a number of hybrid automatic repeat request (HARQ) processes, a maximum number of MIMO layers, enabling processing capability type 2 if supported by the UE, etc. The latter, PDSCH-Config IE, is used to provide the UE with the UE-specific PDSCH configurations per BWP.

The PDSCH-Config IE provides the UE with many parameters for the reception of PDSCH. The parameters include, for example, DMRS configurations, a resource allocation type, TDRA table(s), an aggregation factor, an MCS table to be applied, a minimum scheduling offset K0, etc.

These parameters are configured based on the channel conditions at the UE side and the quality of service requirements of the intended PDSCH transmissions, such as, for example, enhanced mobile broadband (eMBB) or ultra-reliable low latency communications (URLLC)s. For example, if the UE experiences unfavorable channel conditions, configuring a high aggregation factor may be beneficial to compensate for the detrimental channel effects. For UEs supporting URLLC, PDSCH-Config can provide another TDRA table with configurations that differ from eMBB TDRA table. Please note that the UE does not expect to be configured with more than one TDRA table in the same PDSCH-Config.

DCI format 1_0 and 1_1 use either a default TDRA table or a TDRA table provided in PDSCH-Config or PDSCH-ConfgCommon to indicate the time domain allocation of PDSCH depending on the scrambling RNTI, the search space carrying PDCCH, etc. On the other hand, for DCI format 1_2, the TDRA table that should be applied is set forth in Table 4 below.

TABLE 4

| PDSCH-ConfigCommon includes pdsch-TimeDomain-AllocationList | PDSCH-Config includes pdsch-TimeDomain-AllocationList | PDSCH-Config includes pdsch-TimeDomain-AllocationListForDCI-Format1-2 | PDSCH time domain resource allocation to apply |
|---|---|---|---|
| No | No | No | Default A |
| Yes | No | No | pdsch-TimeDomamAllocationList provided in PDSCH-ConfigCommon |
| No/Yes | Yes | No | pdsch-TimeDomainAllocationList provided in PDSCH-Config |
| No/Yes | No/Yes | Yes | pdsch-TimeDomainAllocationListDCI-1-2 provided in PDSCH-Config |

For RRC-connected UEs, a CFR is used for MBS activities and is confined within the associated unicast BWP. The CFR may be defined as an MBS BWP or as an MBS region with contiguous PRBs.

Specifically, for multicast of RRC-connected UEs, a CFR for GC PDCCH/PDSCH is confined within the frequency resource of a dedicated unicast BWP to support simultaneous reception of unicast and multicast in the same slot.

Two options for the CFR for group-common PDCCH/PDSCH include:

In a first option, the CFR is defined as an MBS specific BWP, which is associated with the dedicated unicast BWP and uses the same numerology (SCS and CP). BWP switching is needed between the multicast reception in the MBS specific BWP and unicast reception in its associated dedicated BWP.

Ina a second option, the CFR is defined as an MBS frequency region with a number of contiguous PRBs, which is configured within the dedicated unicast BWP. The starting PRB and the length of PRBs of the MBS frequency region may be indicated.

Basic functionalities that are expected to be provided by CFR, are set forth below. The CFR is expected to provide the configurations of PDSCH, PDCCH, and SPS PDSCH for MBS activities.

The CFR for multicast of RRC-connected UEs, which is confined within the frequency resource of a dedicated unicast BWP and using the same numerology (SCS and CP), includes the following configurations: starting PRB and the number of PRBs; one PDSCH-config for an MBS (i.e., separate from the PDSCH-Config of the dedicated unicast BWP); one PDCCH-config for the MBS (i.e., separate from the PDCCH-Config of the dedicated unicast BWP); and SPS-config(s) for MBS (i.e., separate from the SPS-Config of the dedicated unicast BWP).

One CFR is supported per dedicated unicast BWP for a multicast of RRC-CONNECTED UEs.

Two priority indexes are introduced for multicast, with index 0 meaning low priority and index 1 meaning high priority. A priority index can be included in DCI formats scheduling the GC-PDSCH.

For GC-PDCCH, at least two DCI formats are supported. DCI format 1_0 is used as the baseline for the first DCI format with CRC scrambled with group-RNTI (G-RNTI). DCI format 1_1 or 1_2 is used as the baseline for the second DCI format with CRC scrambled with G-RNTI.

Although embodiments are described with respect to MBS PTM scheme 2, they are equally applicable to other MBS scheduling schemes, such as PTM scheme 1, whenever there is ambiguity regarding which CFR or PDSCH configurations that should be used for the reception of MBS PDSCH. Herein, the term "MBS PDCCH" is used to refer to PDCCH for PTM scheme 1 or PTM scheme 2. Also, the term CFR is used to refer to an MBS specific BWP or an MBS frequency region with contiguous PRBs associated with a dedicated unicast BWP.

To support the reception of multiple MBS services with different requirements or to enable the UE to belong to multiple MBS groups simultaneously, the gNB may configure the UE with multiple CFRs within the same active unicast BWP. Those CFRs may have different attributes, such as, for example, CFR index, starting PRB, number of PRBs, PDSCH-config that provides different configurations for MBS PDSCH reception, etc.

Figure 3:
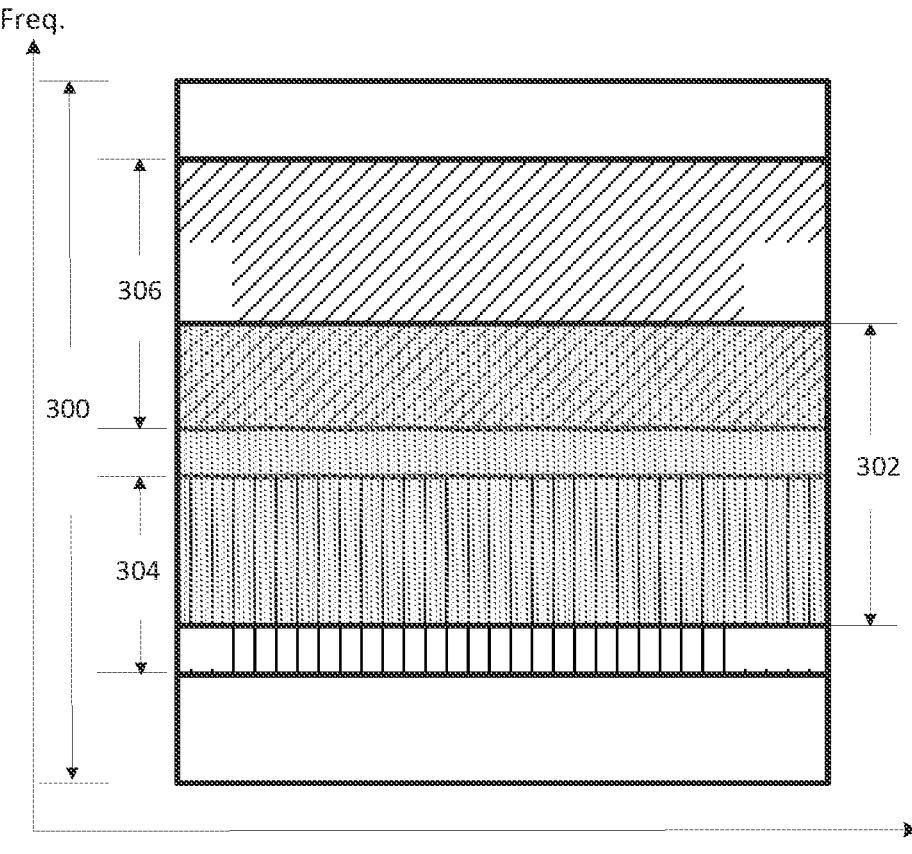
FIG. 3 is a diagram illustrating multiple CFRs within a same active unicast BWP, according to an embodiment.

FIG. 3 is a diagram illustrating multiple CFRs within a same active unicast BWP, according to an embodiment. Specifically, in FIG. 3, the gNB provides the UE with three CFRs in a unicast BWP 300, and a first CFR 302 partially overlaps a second CFR 304 and a third CFR 306. The provided CFRs may be used for different MBS services in the same MBS group and/or MBS services in different MBS groups.

Different procedures are provided to enable the UE to receive an indication or determine which CFR should be used for the reception of the MBS PDSCH. Specifically, once the UE determines or receives an indication of which CFR to use, the UE may apply the corresponding MBS PDSCH configurations associated with this CFR, such as, for example, the TDRA table, the aggregation factor, rate matching patterns, etc. The indication may point to one of the CFR's attributes (e.g., CFR index) that enables the UE to uniquely determine the CFR without any ambiguity.

Thus, for dynamic MBS PDSCH scheduling, the gNB may explicitly or implicitly indicate the CFR index that the UE can use for the reception of MBS PDSCH.

The gNB may include a new DCI field (e.g., a CFR indicator field) in the MBS PDCCH to indicate the CFR to be used for the reception of a DL assignment indicated in the DCI. The CFR indicator field may indicate the CFR index and its bitwidth may be equal to $\lceil \log_2(\text{number of configured CFRs}) \rceil$.

The indices of the CFRs may be configured through higher layer signaling, such as, for example, RRC parameter CFR-Id. Alternatively, the indices may be determined according to particular rules. The starting PRB and/or number of PRB in the CFR may determine its index. For example, for the CFR with the smallest number of PRB (lowest starting PRB), its index is set to zero. The index of the CFR with the second smallest number of PRB (second lowest starting PRB) is set to 1, and so on. If two CFRs have the same number of PRBs (starting PRB), then the one with lower starting PRB (smaller number of PRBs) has a smaller index, respectively. Moreover, the index of the CFR may be determined as a function of MBS service IDs. For example, the CFR index may be equal to MBS service ID, as a one-to-one mapping. However, one-to-many and many-to-one mapping rules may be used to associate a CFR ID with multiple MBS services or vice versa. For example, a CFR ID x may be associated with MBS service IDs in the set {x, x+3} mod "number of MBS services". Please note that the MBS service ID may be configured through higher layer signaling.

The indices of some CFRs may be indicated through higher layer signaling and the indices of the remaining CFRs may be determined according to rules described above. In this case, the indices determined according to some rules may be higher or lower than the indicated one. For example, if the RRC indicated CFR index is 0 and 1, then then the remaining indices start from index 2 using the rules described above.

The presence/absence of a CFR indicator field may be indicated through higher layer signaling, such as, for example, RRC parameter CFR-PresentInDCI. When the field is absent or set to disabled, the UE considers the CFR indicator to be absent. If the field is set to enabled, the UE considers the CFR indicator to be present. If the gNB indicates that the CFR indicator field is absent, the UE may assume that implicit methods, described in greater detail below, may be used to determine the CFR index for the reception of MBS PDSCH.

Alternatively, the UE may determine the presence/absence of the CFR indicator field according to particular rules. For example, if a single CFR associated with one MBS service/group is configured, the UE may consider that the field is absent. Moreover, if the configured CFRs are not overlapped in the frequency domain, the UE may consider that the CFR indicator field is absent and implicit methods, described in greater detail below, may be used to determine the CFR index for the reception of MBS PDSCH.

The CFR indicator field may be a new field introduced in DCI formats used for MBS scheduling that can be based on DCI format 1_0, 1_1, or 1_2. For example, if a DCI format similar DCI 1_0 format, which has fixed bitwidth, is used for scheduling MBS, the reserved bits may be used to carry the CFR indicator field.

To avoid an unnecessary increase in the DCI payload, some of the unused bits may be repurposed to carry the CFR indicator. For example, for DCIs used for PTM scheme 2 (i.e., UE-specific PDCCH), the frequency domain resource assignment field may be defined relative to the number of PRBs in CFR instead of the number PRBs in BWP. When multiple CFRs are configured, a frequency domain resource allocation (FDRA) field may be defined relative to the maximum number of PRBs among the configured CFRs. In other words, in order to determine the frequency domain allocation of MBS PDSCH, the FDRA field is interpreted relative to the first PRB in the CFR, not the first PRB in unicast BWP. This is beneficial because the CFR is typically smaller than the associated unicast BWP, which results in unused bits in the FDRA field that can be repurposed for other usages. Therefore, those bits may carry the CFR index as shown in FIG. 4.

The UE should discern whether the received DCI is for MBS PTM scheme 2 or regular unicast. For example, UE-specific RNTI, which differs from C-RNTI or CS-RNTI, may be used to make such a discernment.

Figure 4:
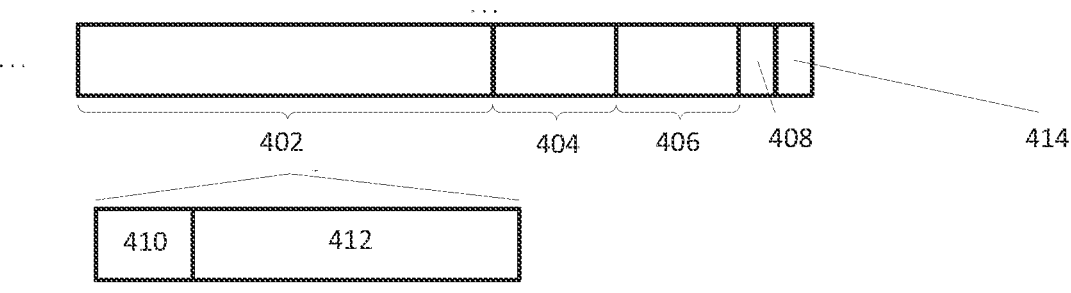
FIG. 4 is a diagram illustrating a DCI payload carrying a CFR indicator, according to an embodiment.

FIG. 4 is a diagram illustrating DCI payload carrying a CFR indicator, according to an embodiment. Specifically, FIG. 4 illustrates a DCI having a frequency domain resource assignment 402, a BWP indicator 404, a carrier indicator 406, a DL or uplink (UL) identifier 408. The frequency domain resource assignment 402 includes a CFR indicator 410 and a frequency domain resource assignment relative to the CFR 412. The DCI includes an additional 1-bit field 414 indicating a purpose of the DCI (e.g., unicast or multicast).

Using either method, more fields may be repurposed. For example, a 1-bit DL/UL identified field is not needed when the DCI is for MBS scheduling, because no UL is expected to be scheduled by MBS PDCCH. Therefore, if the gNB indicates that DCI is for MBS scheduling, a DL/UL identifier can be absent or repurposed to indicate a CFR index. For example, if there are only two configured CFRs, a 1-bit DL/UL identified field can indicate the CFR index instead. If more than two CFRs are configured, the 1-bit DL/UL identified field can be combined with the leftover bits from the FDRA field, as described above, to indicate the CFR index.

If some functionalities, such as cross-component carrier (CC) scheduling, are not supported by MBS PDCCH, then the DCI fields associated with these functionalities are absent or repurposed to indicate CFR index.

Thus, for PDCCH of PTM scheme 2, an FRDA field may be defined relative the number PRB of the CFR with a maximum width among the configured CFRs. The leftover bits may be used to indicate a CFR index. For PDCCH of PTM scheme 2, some the existing DCI fields are meaningless, such as, for example, the DL/UL identifier field. Those fields may either be omitted or repurposed.

PDCCHs for PTM scheme 1 in different CFRs or for different MBS services are expected to be scrambled with different RNTIs, which enable the UE to determine the proper CFR and MBS PDSCH configurations for the reception of MBS PDSCH. However, if there is ambiguity regarding the CFR and the MBS PDSCH configurations, similar approaches as described above may be applied (i.e., having a CFR indicator field in the DCI). This may occur due to constraints on the maximum number of possible configured RNTIs, for example, or scheduling constraints that make the monitoring occasions of PDCCHs for PTM scheme 1 shared between multiple MBS services/CFRs. Moreover, some meaningless fields in the DCI of PDCCH for PTM scheme 1 can be omitted or repurposed, as described above.

Due to the constraints on the DCI budget sizes, the gNB may align the payload size of the unicast DCI and MBS DCI. Though the PDCCH for unicast and PTM scheme 2 are both UE-specific, the same DCI format may have different fields or interpret them differently, as described above. Therefore, the DCI format with the smaller payload size may be appended until they have the same size. In other words, if the same DCI format is used for unicast and MBS PTM scheme 2, and it is monitored in the same/different search spaces associated with the same/different CORESETs, zeros may be appended to the DCI with the smaller payload size until its size is equal to the maximum DCI payload among them.

Alternatively, when the same DCI format is used for both MBS and unicast, the new fields introduced to support MBS operation may be included in the DCI, even when it is used for unicast operation with their values set to zero and no zero padding is added.

The GC-PDCCH may indicate the CFR index to be used. This GC-PDCCH is not necessary to schedule or activate any MBS PDSCH. For example, a new field may be included in DCI 2_0 to indicate the CFR index. Through higher layer signaling, the gNB may provide the UE with the position of this field with the DCI payload of GC-PDCCH, for example, RRC parameter CFR_positionDCI, which may be similar to the positionInDCI used for a slot format indicator (SFI). The size of the field can be determined in a manner similar to that described above.

If the CFR index does not vary dynamically, a semi-static indication through MAC-CE may be beneficial. Therefore, the gNB may indicate the CFR index to be used for a certain duration for the subsequent MBS DL assignment through the MAC-CE. The value/index of this duration may be carried in the MAC-CE as well. For example, higher layer signaling may provide the UE with multiple durations and the MAC-CE indicates the index of one of those durations when indicating the CFR index to be used. Alternatively, the CFR configuration may carry the associated duration to be used if the CFR index is indicated in MAC-CE. Consequently, upon the reception of any subsequent MBS DL assignment, the UE may assume the CFR indicated by MAC-CE is used for the reception of MBS DL.

Figure 5:
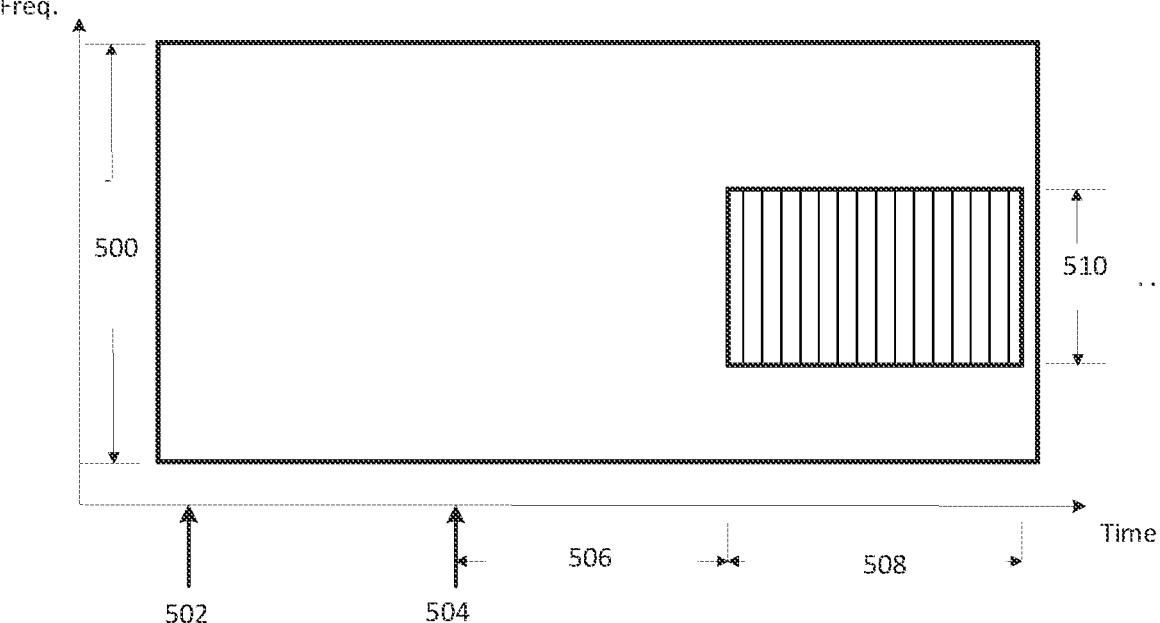
FIG. 5 a diagram illustrating a medium access control (MAC)-control element (CE) used to indicate a CFR index for reception of an MBS DL assignment, according to an embodiment.

FIG. 5 is a diagram illustrating use of a MAC-CE to indicate a CFR index used for reception of MBS DL assignment, according to an embodiment. Specifically, in FIG. 5, the UE does not expect to receive any MBS DL assignment from the instance of receiving the CFR configurations at 502 to the reception of the MAC-CE indicating the index of a CFR 510, within a unicast BWP 500, at 504. Once the UE receives MAC-CE, the UE expects to receive MBS DL after a certain period from the MAC-CE reception 506. This period 506 may be predefined (i.e., provided in the specs), indicated by higher layer signaling, or indicated by the UE as part of its capability signaling, for example. This period 506 can start from the first/last symbol of PDSCH, or the slot, subframe carrying PDSCH that has the MAC-CE to the first symbol, slot, subframe from which the UE can start receiving the scheduling MBS PDCCH or MBS DL assignment itself. The UE continues to use the CFR 510, within the unicast BWP 500, having the index indicated in the MAC-CE for a particular period 508 that can be indicated through higher layer signaling, as described above. At the end of this period 508, the UE does not expect to use the CFR 510 for the MBS until the reception of another MAC-CE.

Thus, there is a gap period between the MAC-CE reception and the beginning of using the indicated CFR for MBS assignments.

As described above, the MAC-CE indicates the CFR index and the duration for which the CFR can be used for the reception of MBS PDSCH. However, the MAC-CE may just indicate the CFR index, without indicating any duration. In this case, the UE continues to use the indicated MAC-CE until reception of another MAC-CE indicating a different CFR or the release of a command through higher layer signaling.

The default CFR that may be used in the periods in which UE does not expect to receive MBS assignments in any other CFR may defined. The default CFR may be explicitly indicated through higher layer signaling, such as, for example, the RRC parameter defaultCFR-Id. Otherwise, it may be implicitly determined according to rules (e.g., the CFR with the lowest/highest starting PRB or the CFR with the smallest/biggest number of PRBs). Moreover, higher layer signaling may indicate an initial CFR to be used when there is no other CFR indicated by other means, such as the MAC-CE. If the initial CFR is not provided through higher layer signaling, the default CFR can be used instead. The UE uses default/initial CFR for the reception of the MBS PDSCH until the reception of the MAC-CE indicating another CFR index and the activation timing of the MAC-CE.

In general, if the UE uses a particular CFR index for the reception of the MBS PDSCH through either the default/initial CFR, or the CFR indicated by an earlier MAC-CE, or any other method, and receives a new MAC-CE indicating another CFR index, the UE continues to use the previous CFR until the MAC-CE activation timing to apply the newly indicated CFR. If the new MAC-CE indicates the CFR index that is currently being used, then the UE continues using the CFR index and no MAC-CE activation timing is required. This scenario may occur if the gNB transmits the MAC-CE carrying the same CFR index multiple times.

Figure 6:
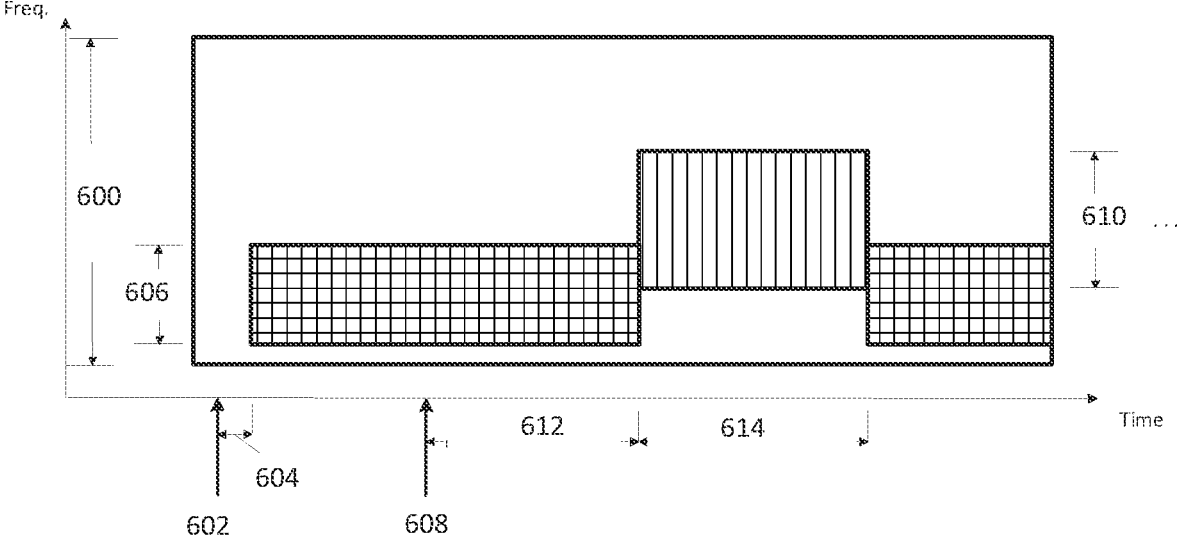
FIG. 6 is a diagram illustrating a default CFR used for reception of DL MBS assignments, according to an embodiment.

FIG. 6 is a diagram illustrating use of the default CFR for reception of DL MBS assignments, according to an embodiment. After a gap period 604 from receiving the CFR configurations at 602, a default CFR 606, within a unicast BWP 600, may be used to receive MBS DL assignments. The gap period 604 may be predefined (e.g., provided in the specs, indicated through higher layer signaling, or indicated by the UE as part of its capability signaling). The UE continues using the default CFR 606, after receiving MAC-CE indicating a first CFR 610, at 608, and in durations 612 in which no other CFR can be monitored. Moreover, after using the first CFR 610, within the unicast BWP 600, for a period 614 indicated in the MAC-CE or provided by configurations, the UE uses the default CFR 606 to monitor MBS DL assignments.

Thus, the default CFR may be used for the reception of the DL MBS assignment when no other CFRs are expected to carry DL MBS assignments.

Figure 7:
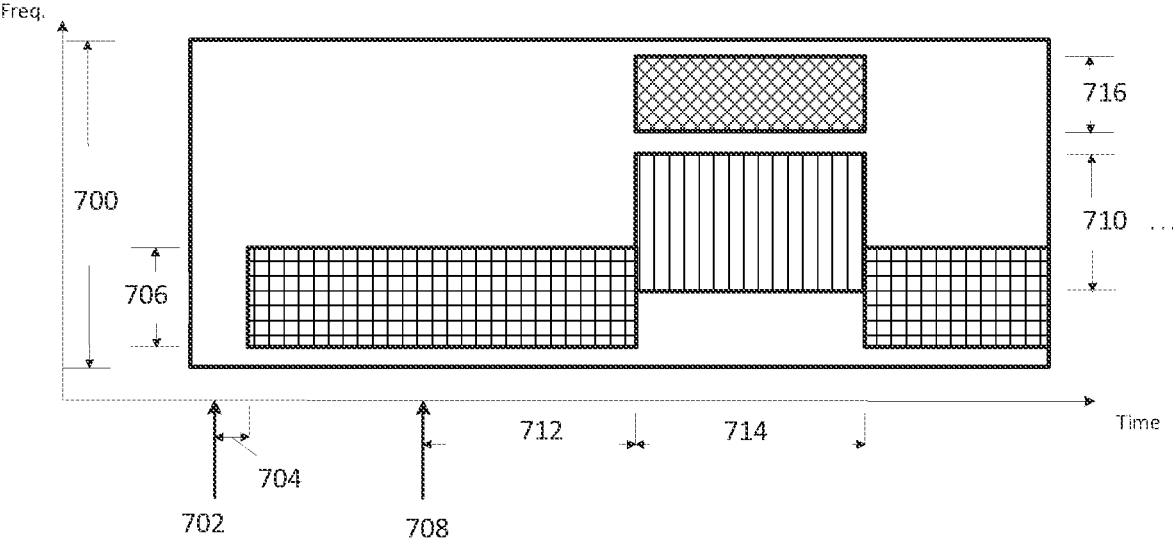
FIG. 7 is a diagram illustrating a MAC-CE indicating indices of multiple CFRs for reception of an DL MBS assignment, according to an embodiment.

FIG. 7 is a diagram illustrating a MAC-CE indicating indices of multiple CFRs for reception of a DL MBS assignment, according to an embodiment. After a gap period 704 from receiving the CFR configurations at 702, a default CFR 706, within a unicast BWP 700, may be used to receive MBS DL assignments. The gap period 704 may be predefined (e.g., provided in the specs, indicated through higher layer signaling, or indicated by the UE as part of its capability signaling). The UE continues using the default CFR 706, after receiving MAC-CE indicating a first CFR 710, at 708, and in durations 712 in which no other CFR can be monitored. Moreover, after using the first CFR 710 and a second CFR 716, within the unicast BWP 700, for a period 714 indicated in the MAC-CE or provided by configurations, the UE uses the default CFR 706 to monitor MBS DL assignments.

Moreover, it may be beneficial if a single MAC-CE indicates the indices of multiple CFRs to be used for the reception DL MBS assignments to reduce the MAC-CE overhead and their associated periods. For example, one period may be applied to all indicated CFRs, or each CFR may have its own period that may be carried individually in the MAC-CE or singled out as part of CFR configurations. In this case, for each MBS PDCCH, the UE may determine which CFR to use through the implicit indication method described in greater detail below. This is beneficial to enable the gNB to down select a subset of the configured CFRs in which an implicit indication may work without any ambiguity.

Similarly, single or multiple default CFRs may be configured or determined. For example, the number of default CFRs may be equal to the number CFRs whose indicators may carried in a single MAC-CE simultaneously. If multiple default CFRs are configured or determined, the UE may determine which default CFR to use through the implicit indication method described in greater detail below.

Thus, the MAC-CE can indicate the indices of multiple CFRs for the reception of DL MBS assignment for the same or different durations.

Another procedure to indicate the CFR index is to associate each with a dedicated RNTI. In other words, the MBS PDCCH (e.g., PDCCH for PTM scheme 2), is scrambled with an RNTI associated with the CFR that will carry the MBS DL assignment indicated by the MBS PDCCH. For example, the gNB may provide the UE with an RNTI associated with the CFR as part of its configurations thought higher layer signaling, such as C-CFR-RNTI, for example. The C-CFR-RNTI is a UE-specific RNTI to be used for PTM scheme 2 and is different from the G-RNTI to be used with PTM scheme 1

Accordingly, C-CFR-RNTI cannot only be used to distinguish between UE-specific PDCCH for unicast or UE-specific PDCCH for PTM scheme 2, but also to indicate the CFR index that the UE should use to receive the MBS DL assignment indicated by MBS PDCCH.

Thus, through higher layer signaling, the gNB can provide the UE with dedicated UE-specific RNTIs associated with CFRs with different indices.

Alternatively, the UE may derive the RNTI associated CFR according to certain rules as a function of legacy UE-specific RNTI, such as C-RNTI, CS-RNTI, MCS-C-RNTI, etc., and an index of the CFR. For example, C-CFR-RNTI may be equal to C-RNTI+CFR index.

Thus, the UE can derive the RNTI associated with CFR index according to some rules.

Another approach to indicate/determine the CFR index is to associate the search space/CORESET with the CFR index. This association can be explicitly indicated through higher layer signaling. For example, as part of search space/CORESET configurations, the gNB may provide the CFR index associated with MBS PDCCH received in any monitoring occasion associated with the search space/CORESET. Alternatively, as part of CFR configurations, the gNB may provide the search space(s)/CORESET(s) indices whose monitoring occasions can carry the MBS PDCCH associated this CFR.

Figure 8:
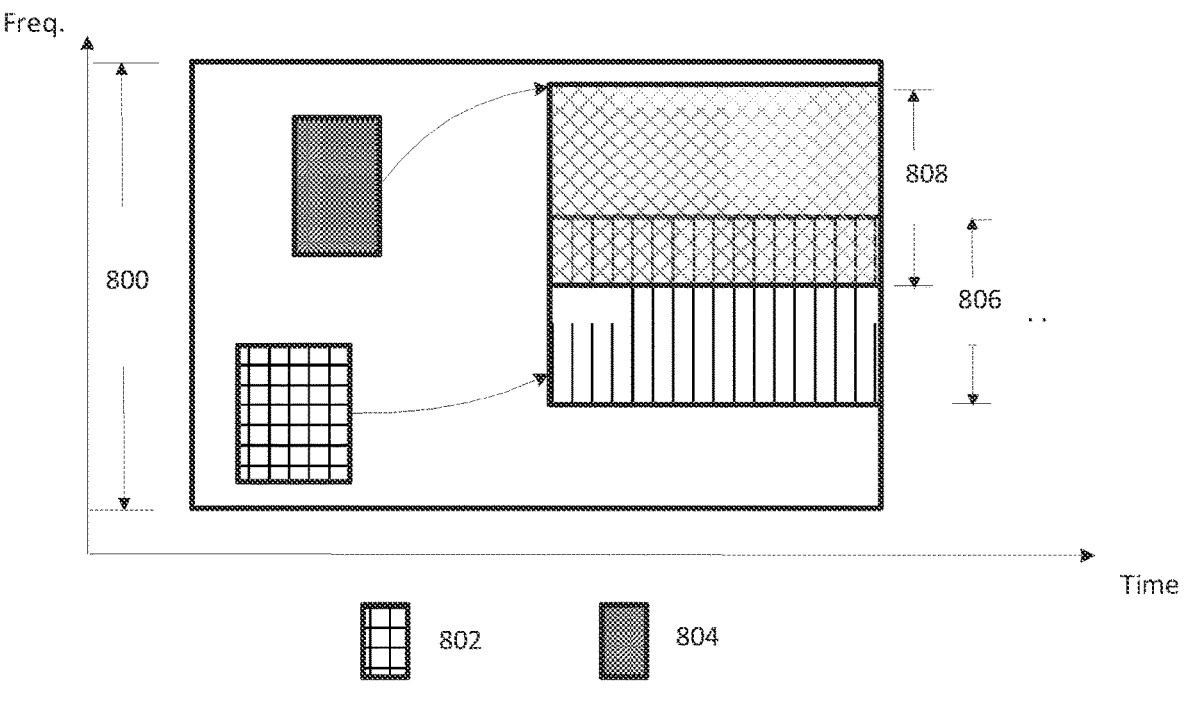
FIG. 8 is a diagram illustrating CORESETs associated with CFR indices, according to an embodiment.

FIG. 8 is a diagram illustrating CORESETs associated with CFR indices, according to an embodiment. An MBS PDCCH received in a first CORESET 802 and a second CORESET 804 schedules MBS PDSCH in a first CFR 806 and a second CFR 808, respectively, within a unicast BWP 800.

Thus, the search space/CORESET can be explicitly associated with CFRs indices through higher layer signaling.

The same search space/CORESET may be associated with multiple CFRs with different indices. In this case, the UE may apply implicit association rules to determine which CFR to use to receive the DL MBS assignment, as described in greater detail below. This is beneficial to enable the gNB to down select a subset of the configured CFRs and associate them with the same search space/CORESET in which implicit indication may work without any ambiguity. This may be realized by indicating a list of CFR indices associated with a particular search space/CORESET as part of its configurations through higher layer signaling.

Thus, a search space/CORESET may be associated with multiple CFR indices. Implicit association may be used to determine which CFR is associated with the received MBS PDCCH.

The association between search space/CORESET and CFR index may also be established by applying particular rules. For example, the search space/CORESET with the same index as the CFR index can be used to receive MBS PDCCH providing DL assignments on the CFR. Also, some rules may associate multiple CFRs indices with a particular search space/CORESET. For example, the search space/CORESET with index m is associated with CFRs with indices given by {m, m+1, m+2} mod "the number of configured CFRs". In this case, the UE may apply implicit association rules to determine which CFR to use to receive the DL MBS assignment, as described in the greater detail below.

Thus, the search space/CORESET can be associated with CFR index/indices using predefined rules.

Different solutions may be provided to enable the UE to implicitly determine the CFR index associated with the received MBS PDCCH in order to receive the scheduled MBS PDSCH.

The indicated frequency domain location of the MBS PDSCH indicated by the frequency domain resource assignment field may implicitly indicate the CFR index that the UE should use to receive MBS PDSCH.

The UE may use the CFR that fully contains the scheduled MBS PDSCH by MBS PDCCH, such as the PDCCH for PTM scheme 2.

Figure 9:
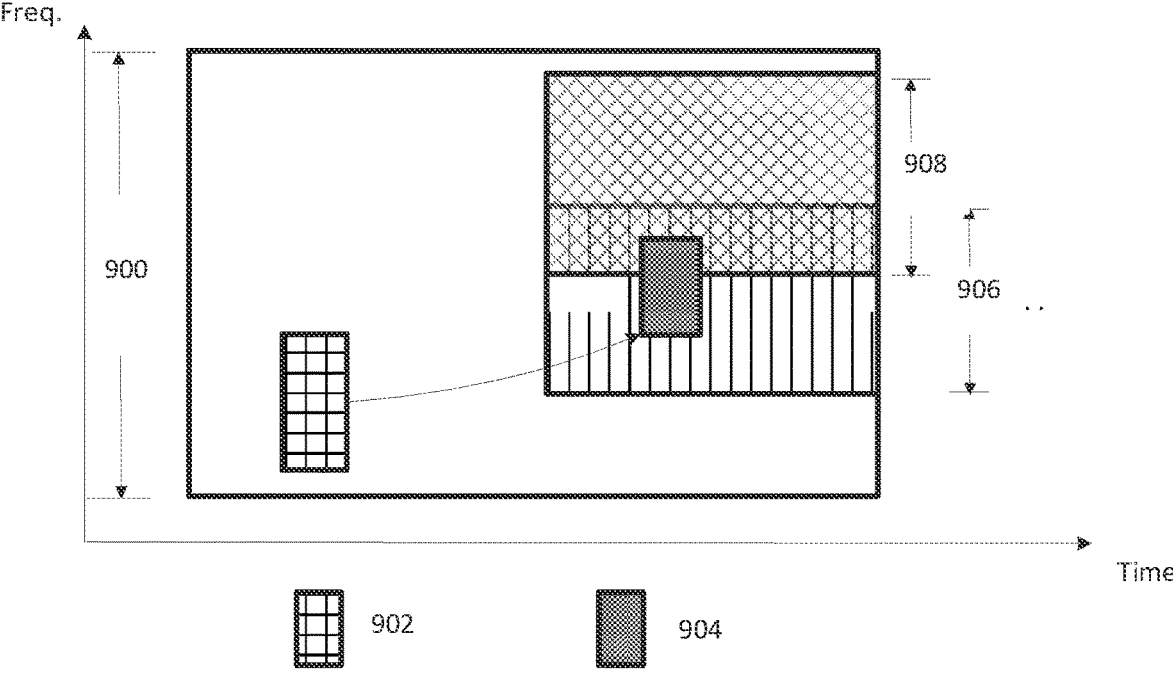
FIG. 9 is a diagram illustrating frequency domain allocation of MBS PDSCH indicating a CFR to use, according to an embodiment.

FIG. 9 is a diagram illustrating frequency domain allocation of MBS PDSCH indicating a CFR to be used, according to an embodiment. Specifically, in FIG. 9 an MBS PDCCH for PTM scheme 2 902 schedules an MBS PDSCH 904 that is fully contained in a first CFR 906 and partially contained in a second CFR 908, within a unicast BWP 900. The UE uses the first CFR 906 and its associated configurations to decode MBS PDSCH. For example, the UE uses the TDRA table associated with the first CFR 906 to interpret the TDRA field in the DCI. Moreover, the UE applies the indicated aggregation factor, rate matching patterns, etc., that are associated with the first CFR 906.

Thus, the UE may assume that the CFR that fully contains the scheduled MBS PDSCH is the one that should be used for the reception of MBS PDSCH, and the UE may apply its associated configurations.

Figure 10:
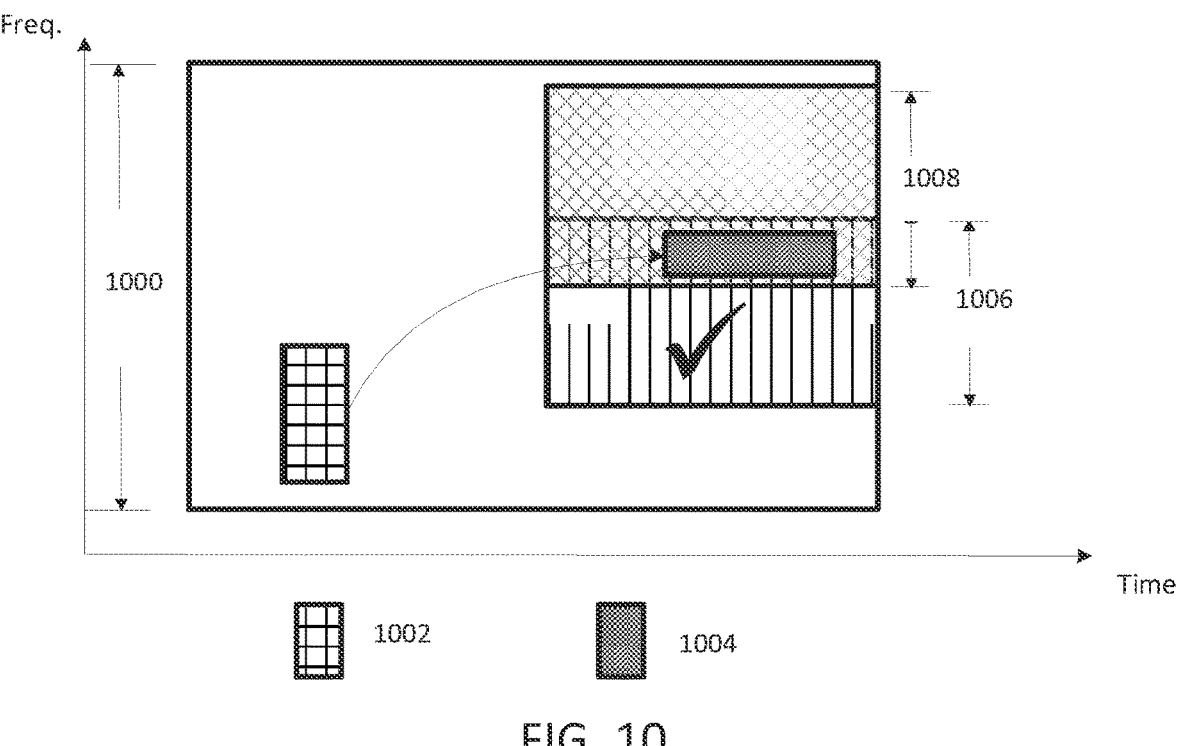
FIG. 10 is a diagram illustrating MBS PDSCH fully confined within multiple CFRs, according to an embodiment.

FIG. 10 is a diagram illustrating MBS PDSCH fully confined within multiple CFRs, according to an embodiment. Specifically, in FIG. 10 an MBS PDCCH for PTM scheme 2 1002 schedules an MBS PDSCH 1004 that is fully contained in a first CFR 1006 and in a second CFR 1008, within a unicast BWP 1000. Therefore, the UE may apply some rules to determine the CFR index and its associated configurations that the UE should use to receive the MBS PDSCH. The UE may assume that the CFR with the smallest/highest index among the CFRs that fully contain the MBS PDSCH is the one that should be used for the reception of MBS PDSCH.

Other rules may be used to determine the CFR index when the MBS PDSCH is fully confined within multiple CFRs. For example, the CFR with the lowest/highest starting PRB among those containing MBS PDSCH may be used for receiving the scheduled MBS PDSCH. Moreover, the CFR with the smallest/largest number of PRBs among those containing MBS PDSCH may be used for receiving the scheduled MBS PDSCH.

Thus, if the MBS PDSCH is confined with multiple CFRs, the UE may determine the CFR and its configurations to receive MBS PDSCH according to some rules. They may be based on the CFR's indices, starting PRBs, the number of PRBs, etc.

Implicit indication of the CFR index may also be based on HARQ related information. Specifically, if the initial transmission occurs in a particular CFR, the UE may expect the retransmissions to occur in the same CFR. The initial transmission may be scheduled using PTM scheme 1, where both MBS PDCCH and MBS PDSCH are group common. Moreover, the UE may determine the CFR for the initial transmission based on the G-RNTI of PDCCH of PTM scheme 1, or any other procedure similar to those described in this disclosure. If a retransmission is needed, PTM scheme 2 may schedule the subsequent retransmission. In this case, the UE may assume that the CFR used for the initial transmission and its configurations will be used for the retransmission.

Figure 11:
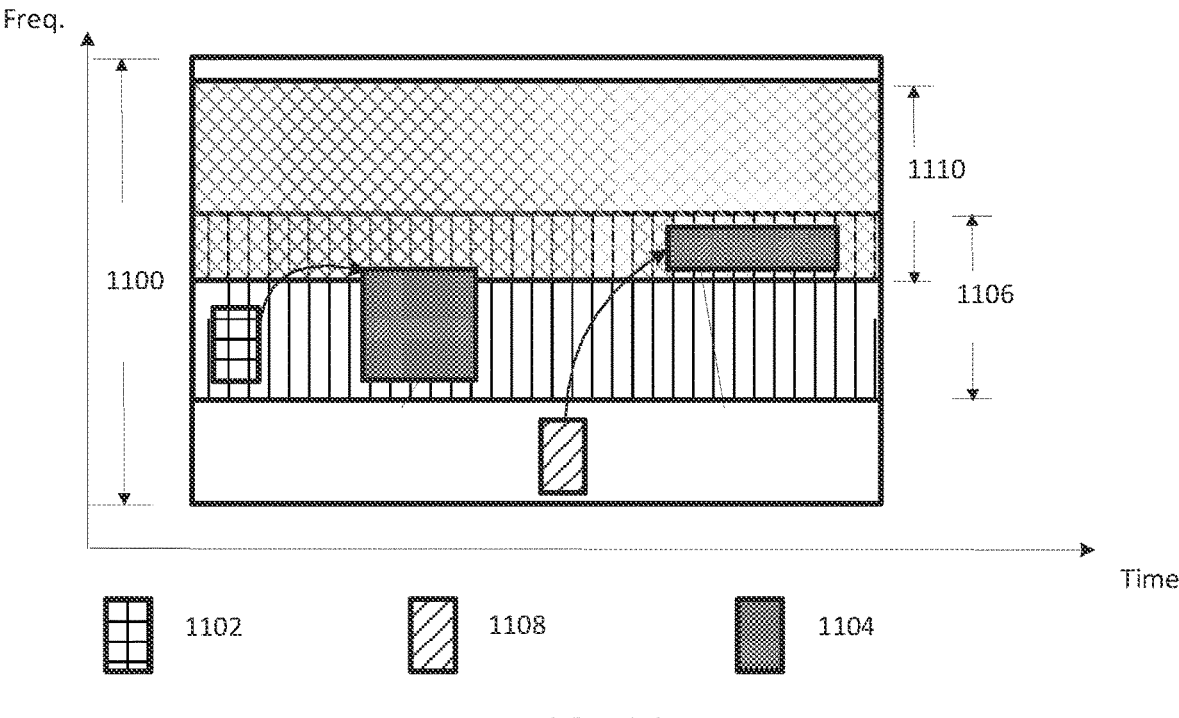
FIG. 11 is a diagram illustrating retransmission of MBS PDSCH occupying the same CFR as an initial transmission, according to an embodiment.

FIG. 11 is a diagram illustrating a retransmission of an MBS PDSCH occupying the same CFR as an initial transmission, according to an embodiment. Specifically, in FIG. 11, GC-PDCCH 1102 is used to schedule an initial transmission of GC-PDSCH 1104 in a first CFR 1106, within a unicast BWP 1100. In this case, both GC-PDCCH 1102 and GC-PDSCH 1104 should be confined within the first CFR 1106. Later, a UE-specific PDCCH 1108 for PTM scheme 2 schedules a retransmission that falls in the intersection between the first CFR 1106 and a second CFR 1110, within the unicast BWP 1100. However, given that the initial transmission is in the first CFR 1106, the UE assumes the retransmission uses the first CFR 1106 as well.

Thus, the UE assumes that both the initial transmission of MBS PDSCH and the subsequent retransmissions occur in the same CFR.

It is different if the HARQ processes are divided among the different CFRs through higher layer signaling. In this case and even for the initial transmission, the UE uses the CFR associated with HARQ process ID indicated in the scheduling MBS PDCCH.

Another method to determine the CFR index may be based on the CFR that fully contains the CORESET that carries the scheduling MBS PDCCH. Specifically, the UE may assume that the CFR that fully contains the CORESET in which MBS PDCCH is transmitted is the one to be used for the reception of MBS PDSCH.

If the CORESET is fully confined within multiple CFRs, the UE may apply some rules to determine the CFR index and its associated configurations that the UE should use to receive MBS PDSCH. As one possibility, the UE may assume that the CFR with the smallest/highest index among the CFRs that fully contain the CORESET carrying MBS PDCCH is the one that should be used for the reception of MBS PDSCH.

Other rules may be used to determine the CFR index when the CORESET carrying the MBS PDCCH is fully confined within multiple CFRs. For example, the CFR with the lowest/highest starting PRB among those containing the CORESET carrying MBS PDCCH may be used for receiving the scheduled MBS PDSCH. Moreover, the CFR with the smallest/largest number of PRBs among those containing the CORESET carrying MBS PDCCH may be used for receiving the scheduled MBS PDSCH.

Thus, the MBS PDSCH may be received in the CFR that fully contains the CORESET that carries the scheduling MBS PDCCH.

Further, if the CORESET is fully confined within multiple CFRs, then the CFR index may be determined according to some rules. They may be based on the CFR's indices, starting PRBs, the number of PRBs, etc.

As another possibility, if the MBS PDCCH is fully confined within a particular CFR, the UE assumes that CFR is used to receive the MBS PDSCH. Moreover, if the MBS PDCCH is fully confined within multiple CFRs, the UE may apply similar procedures to those described above for the case that CORESET is confined within multiple CFRs.

In general, all solutions developed to determine the CFR index for dynamic scheduling can be used for SPS by replacing the scheduling PDCCH with MBS PDCCH for MBS SPS activation.

The solutions developed for dynamic scheduling based on carrying the CFR index in the scheduling DCI can be easily extended to MBS SPS. Specifically, the scheduling MBS PDCCH may be replaced with MBS PDCCH for MBS SPS activation. All other details regarding the field to carry CFR index can be easily extended to SPS.

The solutions developed for dynamic scheduling based on carrying the CFR index in MAC-CE can be easily extended to MBS SPS. The timeline regarding when the indicated CFR index can be used for the reception of MBS SPS PDSCH can be similar to the proposed timeline for dynamic scheduling. The scheduling MBS PDCCH or MBS DL assignment may be replaced with MBS PDCCH for MBS SPS activation or MBS SPS occasions, respectively.

Solutions based on associating the scrambling RNTI of PDCCH with the CFR index can be applied for MBS SPS activation/deactivation as well. A new RNTI associated with the $i^{th}$ CFR, such as CS-CFR-RNTI, may be provided through higher layer signaling as part of a CFR's configurations. When the UE receives the PDSCCH scrambled with CS-CFR-RNTI, the UE can determine which CFR should be used for the activated MBS SPS. Also, other rules can be applied to associate the CFR index with the RNTI, as described for dynamic scheduling.

Solutions based on associating the search space/CORESET with CFR index can also be extended for MBS SPS. Specifically, the UE expects that the MBS PDCCH for MBS SPS activation received in the search space/CORESET is associated with a particular CFR index to activate MBS SPS in this CFR.

Thus, similar solutions to those applied for dynamic grant to explicitly determine the CFR index can be applied for SPS by using MBS PDCCH for MBS SPS activation.

In another approach, MBS SPS may be associated with a particular CFR index. Therefore, when gNB activates particular MBS SPS configurations, the UE can determine which CFR should be used for the reception of MBS SPS.

This association can be indicated through higher layer signaling, such as, for example, RRC parameter CFR-Id, as part of SPS configurations. Configuring such a parameter does not prevent the gNB from using this SPS for unicast transmission. However, when the SPS configuration is used for MBS transmission (e.g. activated through GC-PDCCH or UE-specific PDCCH for MBS), the UE can directly determine which CFR is associated with the SPS.

The same SPS may be associated with multiple CFRs. In this case, the UE may use implicit determination procedures described herein to determine the CFR associated with the activated SPS.

Thus, the SPS configurations may be explicitly associated with CFR(s) index/indices through higher layer signaling.

Another method to establish the association between the ID of SPS configurations and the CFR may be determined according to particular rules. For example, the SPS configurations with the same index as the CFR index are associated together. Therefore, when the SPS configuration is used for MBS transmission (e.g. activated through GC-PDCCH or UE-specific PDCCH for MBS), the UE can directly determine which CFR. Also, some rules may associate multiple CFRs indices with particular SPS configurations index. For example, the SPS configurations with index m is associated with CFRs with indices given by {m, m+1, m+2} mod "the number of configured CFRs". In this case, the UE may apply implicit association rules to determine which CFR to use to receive the DL MBS SPS, as described in greater detail below.

Thus, SPS configurations can be associated with CFR(s) index/indices using predefined rules.

The solutions developed to implicitly indicate the CFR index for dynamic scheduling can be applied and extended to MBS SPS. Specifically, the scheduling MBS PDCCH may be replaced with MBS PDCCH for MBS SPS activation, when applicable.

The MBS PDSCH containment based indication solutions may be extended for MBS SPS based on frequency domain allocation of MBS SPS indicated by MBS PDCCH for MBS SPS activation. Similar rules to those developed for dynamic grant may be easily extended to be applied MBS SPS.

The MBS PDCCH containment based indication solutions may be extended for MBS SPS. Specifically, the CFR index may be determined based on the CFR that fully unicast BWP 1216, and a third CFR 1212 of the third UE 1206 within a third unicast BWP 1218. In this case, it is beneficial to provide the first UE 1202 with multiple configurations for MBS PDSCH reception to be aligned with the MBS PDSCH configurations of the second UE 1204 and the third UE 1206. Therefore, different procedures are provided to provide such configurations and approaches to indicate which one to apply.

Multiple PDSCH configurations may be provided to support different MBS services and/or multiple MBS groups. They may include, but are not limited to, any configurations in legacy PDSCH-Config, such as a time domain resource allocation list, DMRS configurations, an aggregation factor, a rate matching pattern, etc.

When these configurations are provided, they may be associated with a particular index that may be used to indicate which set of configurations should be applied for the reception of MBS PDSCH.

Therefore, the gNB may provide the UE with multiple lists of MBS PDSCH configurations through higher layer signaling. For example, as part of PDSCH-Config IE, the gNB may provide this list through an RRC list (e.g., mbs-ConfigList as set forth below).

```
-- ASN1START
-- TAG-PDSCH-CONFIG-START
PDSCH-Config ::=                          SEQUENCE {
    dataScramblingIdentityPDSCH              INTEGER (0..1023)
OPTIONAL,              -- Need S
    dmrs-DownlinkForPDSCH-MappingTypeA       SetupRelease { DMRS-DownlinkConfig }
OPTIONAL,              -- Need M
    dmrs-DownlinkForPDSCH-MappingTypeB       SetupRelease { DMRS-DownlinkConfig }
OPTIONAL,              -- Need M
    tci-StatesToAddModList                   SEQUENCE (SIZE(1..maxNrofTCI-States)) OF TCI-State
OPTIONAL,              -- Need N
    tci-StatesToReleaseList                  SEQUENCE (SIZE(1..maxNrofTCI-States)) OF TCI-StateId
OPTIONAL,              -- Need N
    vrb-ToPRB-Interleaver                    ENUMERATED {n2, n4}
OPTIONAL,              -- Need S
    resourceAllocation                       ENUMERATED { resourceAllocationType0,
resourceAllocationType1, dynamicSwitch},
    pdsch-TimeDomainAllocationList           SetupRelease {PDSCH-TimeDomainResourceAllocationList}
OPTIONAL,              -- Need M
    pdsch-AggregationFactor                  ENUMERATED { n2, n4, n8 }
OPTIONAL,              -- Need S
    mbs-ConfigList       SetupRelease { MBS-ConfigParamList }
OPTIONAL,              -- Need M
--[Irrelevant fields have been omitted] --
}
-- TAG-PDSCH-CONFIG-STOP
-- ASN1STOP
``` contains the CORESET that carries MBS PDCCH for MBS SPS activation. Similar rules to those developed for dynamic scheduling when the CORESET is fully confined within multiple CFRs can be applied for MBS SPS as well.

Thus, similar solutions to those applied for dynamic grant to implicitly determine CFR index may be applied for SPS by using MBS PDCCH for MBS SPS activation.

Figure 12:
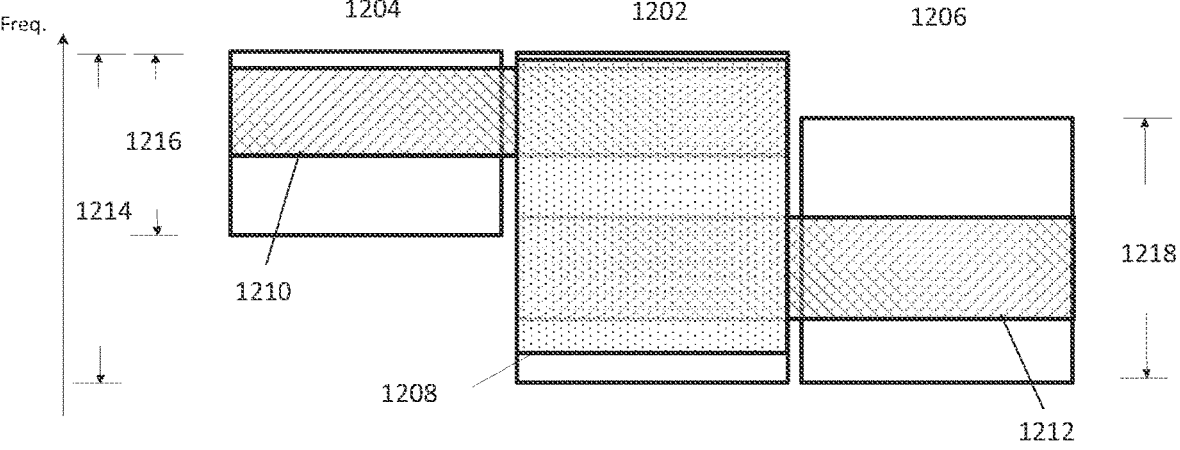
FIG. 12 is a diagram illustrating a CFR of a UE that contains CFRs of multiple MBS groups, according to an embodiment.

FIG. 12 is a diagram illustrating a CFR of a UE containing CFRs of multiple MBS groups, according to an embodiment. Instead of configuring multiple CFRs to support different MBS services and/or multiple MBS groups, a single CFR with multiple PDSCH configurations may realize the same goal. Specifically, in FIG. 12, a first UE 1202 is interested in being a member of two MBS groups, one with a second UE 1204 and other with a third UE 1206. In this case, the first UE 1202 may be configured with a first CFR 1208 within a first BWP 1214 that at least contains a second CFR 1210 of the second UE 1204 within a second The mbs-ConfigList may contain the PDSCH configurations through higher layer signaling, such as, for example, MBS-ConfigParam, that differ from those of unicast. Those configurations may be a different TDRA table than what is used for unicast, aggregation factor, rate matching pattern, etc. If any MBS PDSCH configuration is not provided in MBS-ConfigParam, the UE may apply the provided unicast configuration instead. Each group of MBS configurations is associated with a particular ID through higher layer signaling, such as, for example, MBS-ConfigId. The maximum number of the group of MBS configurations that may be configured may be predefined or provided through higher layer signaling or indicated by the UE as part of its capability signaling. For example, it may be denoted as maxN-rofMBSgroups-Services.

```
-- ASN1START
-- TAG- MBS-ConfigParamList-START
MBS-ConfigParamList ::= SEQUENCE (SIZE(1..maxNrofMBSgroups-Services)) OF MBS-ConfigParam
MBS-ConfigParam ::= SEQUENCE {
    MBS-ConfigId                          INTEGER(0.. maxNrofMBSgroups-Services-1)
    pdsch-TimeDomainAllocationList        SetupRelease {PDSCH-TimeDomainResourceAllocationList}
OPTIONAL,           -- Need M
    pdsch-TimeDomainAllocationList-r16          SetupRelease { PDSCH-
TimeDomainResourceAllocationList-r16 }              OPTIONAL, -- Need M
    pdsch-AggregationFactor               ENUMERATED { n2, n4, n8 }
OPTIONAL,           -- Need S
    rateMatchPatternToAddModList          SEQUENCE (SIZE (1..maxNrofRateMatchPatterns)) OF
RateMatchPattern     OPTIONAL,     -- Need N
    rateMatchPatternToReleaseList         SEQUENCE (SIZE (1..maxNrofRateMatchPatterns)) OF
RateMatchPatternId OPTIONAL,       -- Need N
    rateMatchPatternGroup1                RateMatchPatternGroup
OPTIONAL,              -- Need R
    rateMatchPatternGroup2                RateMatchPatternGroup
OPTIONAL,              -- Need R
}
-- TAG- MBS-ConfigParamList-STOP
-- ASNISTOP
```

Thus, the UE can be provided with multiple MBS PDSCH configurations groups to support different MBS services/group through higher layer signaling.

Multiple procedures may indicate the ID of the MBS PDSCH configurations group that the UE should apply to receive MBS PDSCH. Different procedures that indicate the CFR index can be easily extended and applied to indicate the ID of the MBS PDSCH configurations group. The CFR index may be replaced with the ID of MBS PDSCH configurations group.

For DCI based solutions, a new DCI field may be used indicate the ID of the MBS PDSCH configurations group with bitwidth of $\lceil \log_2(\text{number of MBS PDSCH configurations})\rceil$.

The presence of such field in the DCI may be indicated through higher layer signaling or according to particular rules similar to those described above when multiple CFRs are configured. For example, if only one group of MBS PDSCH configurations is provided, the UE may assume that repurposing of some the existing fields in the DCI payload, similar solutions to those described above for multiple CFRs can be applied here as well.

For MAC-CE based solutions, similar to the case of indicating the CFR in MAC-CE for the subsequent MBS PDSCH, the gNB may provide the UE with the ID of the MBS PDSCH configurations group to be used for subsequent MBS PDSCH through the MAC-CE. The timeline for applying the indicated ID of the MBS PDSCH configurations group can be similar to the one described in the case of configuring multiple CFRs.

Moreover, a default MBS PDSCH configurations group may be used in a similar approach as the default CFR index.

For RNTI based solutions, a different RNTI of the scheduling MBS PDCCH may be associated with a different ID of the MBS PDSCH configurations group. Those RNTI can be provided through higher layer signaling, such as the RRC parameter as shown in the IE message below. Also, the UE may determine the RNTI associated with the ID of the MBS PDSCH configurations group using similar rules to those described above in the case of configuring multiple CFRs.

```
-- ASN1START
-- TAG- MBS-ConfigParamList-START
MBS-ConfigParamList ::= SEQUENCE (SIZE(1..maxNrofMBSgroups-Services)) OF MBS-ConfigParam
MBS-ConfigParam ::= SEQUENCE {
    MBS-ConfigId                          INTEGER(0.. maxNrofMBSgroups-Services-1)
    MBS-group-RNTI                        RNTI-Value OPTIONAL, -- Need R
    pdsch-TimeDomainAllocationList        SetupRelease {PDSCH-TimeDomainResourceAllocationList}
OPTIONAL,           -- Need M
    pdsch-TimeDomainAllocationList-r16          SetupRelease  { PDSCH-
TimeDomainResourceAllocationList-r16 }              OPTIONAL,  -- Need M
    pdsch-AggregationFactor               ENUMERATED { n2, n4, n8 }
OPTIONAL,           -- Need S
    rateMatchPatternToAddModList          SEQUENCE (SIZE (1..maxNrofRateMatchPatterns)) OF
RateMatchPattern                  OPTIONAL,       -- Need N
    rateMatchPatternToReleaseList         SEQUENCE (SIZE (1..maxNrofRateMatchPatterns)) OF
RateMatchPatternId                OPTIONAL,       -- Need N
    rateMatchPatternGroup1                          RateMatchPatternGroup
OPTIONAL,              -- Need R
    rateMatchPatternGroup2                          RateMatchPatternGroup
OPTIONAL,              -- Need R
}
-- TAG- MBS-ConfigParamList-STOP
-- ASN1STOP
```

65 this field is absent and the provided MBS PDSCH configurations is used all the time. Regarding using a new field or For solutions based on associating the search space/CORESET with ID of the MBS PDSCH configurations group, similar approaches to those described with respect to multiple CFRs can be applied here. For example, the search space/CORESET ID associated with a particular MBS PDSCH configurations group may be provided through higher layer signaling, as shown below. Also, the search space/CORESET may be associated with an ID of the MBS PDSCH configurations group using predefined rules as described above in the case of configuring multiple CFRs.

```
-- ASN1START
-- TAG- MBS-ConfigParamList-START
MBS-ConfigParamList ::=   SEQUENCE (SIZE(1..maxNrofMBSgroups-Services)) OF MBS-ConfigParam
MBS-ConfigParam ::=   SEQUENCE {
    MBS-ConfigId                         INTEGER(0.. maxNrofMBSgroups-Services-1)
    Asso-CORESET-Id                      ControlResourceSetId        OPTIONAL,
    Asso-SS-Id                           searchSpaceId               OPTIONAL,
    pdsch-TimeDomainAllocationList        SetupRelease {PDSCH-TimeDomainResourceAllocationList}
OPTIONAL,        -- Need M
    pdsch-TimeDomainAllocationList-r16                             SetupRelease  {  PDSCH-
TimeDomainResourceAllocationList-r16 }       OPTIONAL,   -- Need M
    pdsch-AggregationFactor              ENUMERATED { n2, n4, n8 }
OPTIONAL,        -- Need S
    rateMatchPatternToAddModList            SEQUENCE (SIZE (1..maxNrofRateMatchPatterns)) OF
RateMatchPattern        OPTIONAL,     -- Need N
    rateMatchPatternToReleaseList           SEQUENCE (SIZE (1..maxNrofRateMatchPatterns)) OF
RateMatchPatternId      OPTIONAL,     -- Need N
    rateMatchPatternGroup1                                     RateMatchPatternGroup
OPTIONAL,        -- Need R
    rateMatchPatternGroup2                                     RateMatchPatternGroup
OPTIONAL,        -- Need R
}
-- TAG- MBS-ConfigParamList-STOP
-- ASN1STOP
```

A similar framework may be applied for MBS SPS as described for the case when multiple CFRs are configured. In some solutions, the gNB may use the MBS PDCCH to activate MBS SPS configurations. In other solutions, the MBS SPS may be associated with a particular ID of the MBS PDSCH configurations group similar to the developed solutions when multiple CFRs are configured, either through higher layer signaling or according to some rules.

Thus, similar solutions to those applied for indicating the CFR index can be used to indicate the ID of the MBS PDSCH configurations group.

In another way to provide different PDSCH configurations to support different MBS services/group, multiple TDRA tables may be provided and associated with different DCI formats. Two additional TDRA tables may be configured through higher layer signaling to support a low priority MBS, (e.g., eMBB MBS) and a high priority MBS (e.g., URLLC MBS). Therefore, RRC parameters, such as MBS-pdsch-TimeDomainAllocationList and MBS-pdsch-TimeDomainAllocationListDCI-1-2-r16, may be provided as part of PDSCH-Config IE, as shown in the IE below.

```
-- ASN1START
-- TAG-PDSCH-CONFIG-START
PDSCH-Config ::=                         SEQUENCE {
                    --[Irrelevant fields have been omitted] --
    pdsch-TimeDomainAllocationList          SetupRelease { PDSCH-TimeDomainResourceAllocationList
}     OPTIONAL,  -- Need M
    MBS-pdsch-TimeDomainAllocationList                        SetupRelease  {  PDSCH--
TimeDomainResourceAllocationList }         OPTIONAL,       -- Need M
                    --[Irrelevant fields have been omitted] --
-- Start of the parameters for DCI format 1_2 introduced in V16.1.0
                    --[Irrelevant fields have been omitted] --
    pdsch-TimeDomainAllocationListDCI-1-2-r16                    SetupRelease  {  PDSCH-
TimeDomainResourceAllocationList-r16 }  OPTIONAL,        -- Need M
    MBS--pdsch-TimeDomainAllocationListDCI-1-2-r16               SetupRelease  {  PDSCH-
TimeDomainResourceAllocationList-r16 }  OPTIONAL,        -- Need M
                    --[Irrelevant fields have been omitted] --
}
-- TAG-PDSCH-CONFIG-STOP
-- ASN1STOP
```

Thus, two additional TDRA tables may be configured for MBS different from those configured for unicast.

The UE may determine which TDRA to use based on the used DCI format for scheduling MBS or activating MBS SPS.

Assuming two groups of DCI formats are supported by MBS. Group 0 of DCI formats may be used for low priority scheduling and may contain DCI formats similar to DCI format 1_0 and 1_1, and they can be referred to as DCI format 1_0A and 1_1A. On the other hand, Group 1 of DCI formats may be used for high priority scheduling and may contain DCI formats similar to DCI format 1_2, and they can be referred to as DCI format 1_2A.

Table 5 and Table 6 show an example in which TDRA table may be applied depending on the received MBS DCI format.

TDRA for retransmission MBS is the same as those used for the initial transmission of MBS PDSCH.

Accordingly, a method is provided to enable the gNB to schedule MBS across different CFRs and explicitly indicate the index of the used CFR. To reduce the signaling overhead, a method is provided that enables implicit determination of the CFR index based on the containment of the scheduled PDSCH or the CORESET carrying the scheduling PDCCH. The indication of the CFR index for MBS SPS may be enabled either in the activation DCI or by associating SPS configuration with particular CFR. Also, the indication of the CFR for MBS SPS can be accomplished implicitly based on the containment of the scheduled PDSCH or the CORE-SET carrying the scheduling PDCCH. A single CFR may be

TABLE 5

Applicable TDRA table for MBS DCI formats in Group 0

| PDSCH-ConfigCommon includes pdsch-TimeDomain-AllocationList | PDSCH-Config includes pdsch-TimeDomain-AllocationList | PDSCH-Config includes MBS-pdsch-TimeDomain-AllocationList | PDSCH time domain resource allocation to apply |
|---|---|---|---|
| No | No | No | Default A |
| Yes | No | No | pdsch-TimeDomainAllocationList provided in PDSCH-ConfigCommon |
| No/Yes | Yes | No | pdsch-TimeDomainAllocationList provided in PDSCH-Config |
| No/Yes | No/Yes | Yes | MBS-pdsch-TimeDomainAllocationList provided in PDSCH-Config |

TABLE 6

Applicable TDRA table for MBS DCI formats In Group 1

| PDSCH-ConfigCommon includes pdsch-TimeDomain-AllocationList | PDSCH-Config includes pdsch-TimeDomain-AllocationList | PDSCH-Config includes MBS-pdsch-TimeDomain-AllocationList | PDSCH-Config includes MBS-pdsch-TimeDomain-AllocationListDCI-1-2-r16 | PDSCH time domain resource allocation to apply |
|---|---|---|---|---|
| No | No | No | No | Default A |
| Yes | No | No | No | pdsch-TimeDomainAllocationList provided in PDSCH-ConfigCommon |
| No/Yes | Yes | No | No | pdsch-TimeDomainAllocationList provided in PDSCH-Config |
| No/Yes | No/Yes | Yes | No | MBS-pdsch-TimeDomainAllocationList provided in PDSCH-Config |
| No/Yes | No/Yes | No/Yes | Yes | MBS-pdsch-TimeDomainAllocationListDCI-1-2-r16 provided in PDSCH-Config |

Thus, the used MBS DCI format can indicate which TDRA table is to be used according to predefined rules.

Similar to the solutions developed for the case where multiple CFRs are configured, the UE may assume that the ID of the MBS PDSCH configurations group or the used associated with multiple MBS PDSCH configurations and procedures to indicate/determine which configurations to be applied.

Figure 13:
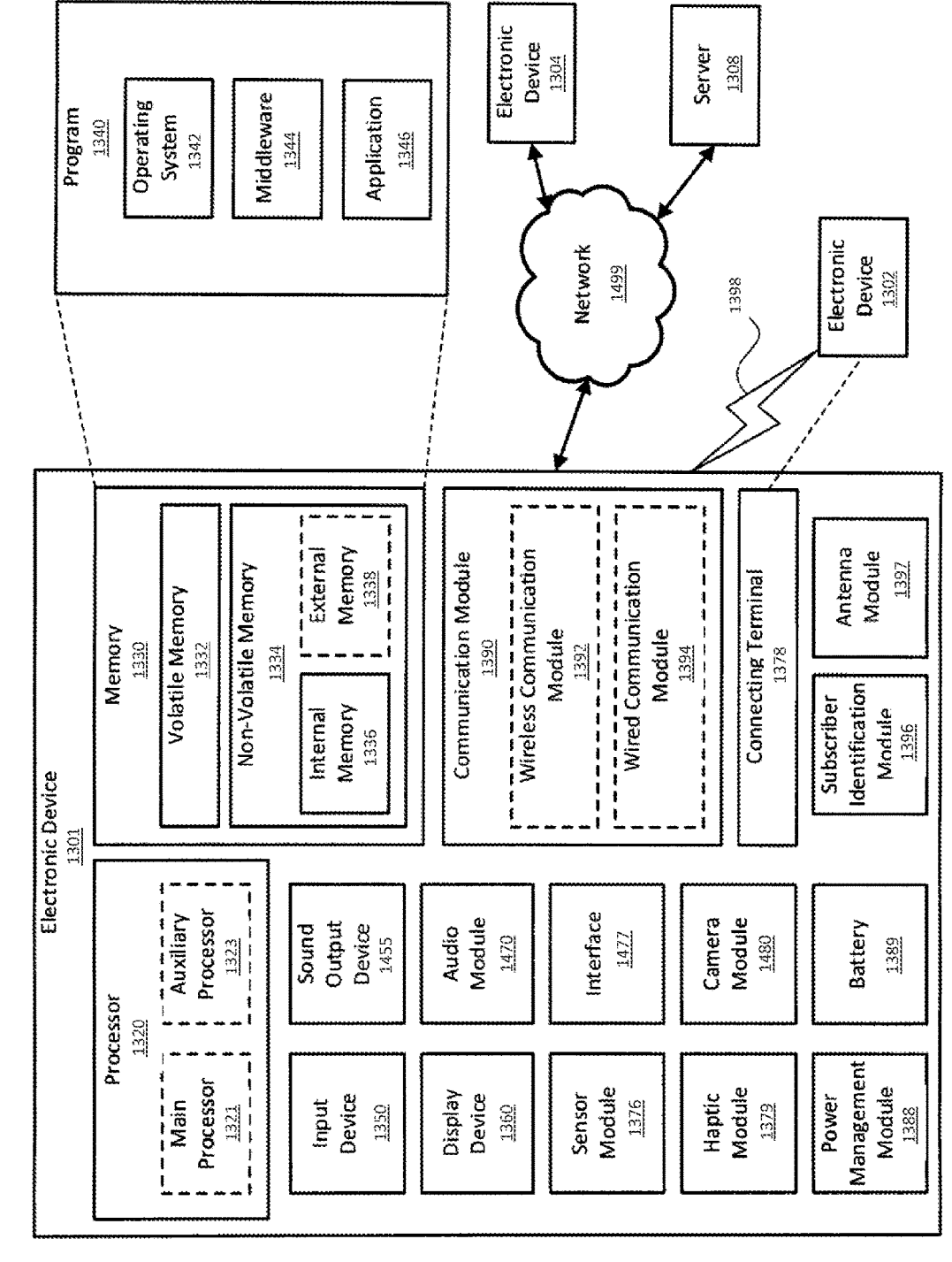
FIG. 13 is a block diagram of an electronic device in a network environment, according to an embodiment.

FIG. 13 is a block diagram of an electronic device in a network environment, according to one embodiment. Referring to FIG. 13, an electronic device 1301 in a network environment 1300 may communicate with an electronic device 1302 via a first network 1398 (e.g., a short-range wireless communication network), or an electronic device 1304 or a server 1308 via a second network 1399 (e.g., a long-range wireless communication network). The electronic device 1301 may communicate with the electronic device 1304 via the server 1308. The electronic device 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In one embodiment, at least one (e.g., the display device 1360 or the camera module 1380) of the components may be omitted from the electronic device 1301, or one or more other components may be added to the electronic device 1301. Some of the components may be implemented as a single integrated circuit (IC). For example, the sensor module 1376 (e.g., a fingerprint sensor, an iris sensor, or an illuminance sensor) may be embedded in the display device 1360 (e.g., a display).

The processor 1320 may execute, for example, software (e.g., a program 1340) to control at least one other component (e.g., a hardware or a software component) of the electronic device 1301 coupled with the processor 1320, and may perform various data processing or computations. As at least part of the data processing or computations, the processor 1320 may load a command or data received from another component (e.g., the sensor module 1376 or the communication module 1390) in volatile memory 1332, process the command or the data stored in the volatile memory 1332, and store resulting data in non-volatile memory 1334. The processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or execute a particular function. The auxiliary processor 1323 may be implemented as being separate from, or a part of, the main processor 1321.

The auxiliary processor 1323 may control at least some of the functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). The auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. The display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. The audio module 1370 may obtain the sound via the input device 1350, or output the sound via the sound output device 1355 or a headphone of an external electronic device 1302 directly (e.g., wired) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. The sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device 1302 directly (e.g., wired) or wirelessly. The interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device 1302. The connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via tactile sensation or kinesthetic sensation. The haptic module 1379 may include, for example, a motor, a piezoelectric element, or an electrical stimulator.

The camera module 1380 may capture a still image or moving images. The camera module 1380 may include one or more lenses, image sensors, image signal processors, or flashes.

The power management module 1388 may manage power supplied to the electronic device 1301. The power management module 1388 may be implemented as at least part of, for example, a power management integrated circuit (PMIC).

The battery 1389 may supply power to at least one component of the electronic device 1301. The battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. The communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or a standard of the Infrared Data Association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. The antenna module 1397 may include one or more antennas, and, therefrom, at least one antenna appropriate for a communication scheme used in the communication network, such as the first network 1398 or the second network 1399, may be selected, for example, by the communication module 1390 (e.g., the wireless communication module 1392). The signal or the power may then be transmitted or received between the communication module 1390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. All or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

One embodiment may be implemented as software (e.g., the program 1340) including one or more instructions that are stored in a storage medium (e.g., internal memory 1336 or external memory 1338) that is readable by a machine (e.g., the electronic device 1301). For example, a processor of the electronic device 1301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for performing rate matching by a user equipment (UE), the method comprising:

receiving, at the UE, a group common-physical downlink shared channel (GC-PDSCH) for communications in a common frequency resource (CFR);

receiving, at the UE, an information element that carries configurations for a GC-PDSCH transmission in the CFR;

determining at least one parameter for determining a transport block size (TBS) for the GC-PDSCH transmission in the CFR from at least one field of the information element; and determining the TBS for the GC-PDSCH transmission in the CFR based on the at least one parameter, wherein the information element includes a radio resource control (RRC) parameter that indicates reserved physical resource blocks (PRBs), per CFR, that are unavailable for PDSCH reception.

2. The method of claim 1, wherein the UE receives the GC-PDSCH transmission in the CFR and a unicast transmission.

3. The method of claim 1, further comprising determining a size of limited buffer rate matching (LBRM) for the GC-PDSCH transmission in the CFR.

4. The method of claim 3, further comprising:

determining whether a CFR length for the GC-PDSCH transmission is configured;

determining a number of PRBs for determining the LMBR based on a size of the CFR, in case that the CFR length is configured; and determining a number of PRBs for determining the LMBR based on a size of a bandwidth part (BWP) containing the GC-PDSCH transmission, in case that the CFR length is not configured.

5. The method of claim 1, wherein:

the information element is received as part of RRC signaling;

the at least one parameter comprises at least one of a maximum number of multiple input- multiple output (MIMO) layers, a modulation and coding scheme (MCS) table, and an overhead parameter for the GC-PDSCH transmission in the CFR;

in case that the at least one field of the information element is not configured to determine the maximum number of MIMO layers, the maximum number of MIMO layers is predefined;

in case that the at least one field of the information element is not configured to determine the MCS table, a modulation order is set to a default modulation order value based on a standard MCS-table for 64 quadrature amplitude modulation (QAM); and in case that the at least one field of the information element is not configured to determine the overhead parameter, the overhead parameter is set to a default overhead value.

6. The method of claim 1, wherein the UE is RRC idle or inactive.

7. The method of claim 1, further comprising:

transmitting, to a base station, a capabilities report indicating whether the UE supports different LBRM sizes between an initial GC-PDSCH transmission using a point-to-multipoint transmission scheme and a subsequent UE-specific PDSCH transmission using a point-to-point transmission scheme.

8. The method of claim 1, further comprising determining one or more rate matching patterns for the GC-PDSCH in the CFR from one or more fields of the information element, wherein the one or more rate matching patterns comprise resource elements that are not available for the GC-PDSCH in the CFR.

9. The method of claim 8, further comprising determining one or more rate matching pattern groups for the GC-PDSCH in the CFR from the one or more fields of the information element, wherein the one or more rate matching pattern groups comprise grouped rate matching patterns other than the one or more rate matching patterns.

10. The method of claim 9, further comprising:

receiving a group common-physical downlink control channel (GC-PDCCH) for communications in the CFR;

receiving a downlink control information (DCI) format in the GC-PDCCH in the CFR having a first DCI format or a second DCI format, the second DCI format having a rate matching indicator field;

applying the one or more rate matching patterns and the grouped rate matching patterns of the one or more rate matching pattern groups for the GC-PDSCH in the CFR scheduled by the first DCI format; and applying the one or more rate matching patterns and selectively applying the grouped rate matching patterns based on values of the rate matching indicator field for the GC-PDSCH in the CFR scheduled by the second DCI format.

11. The method of claim 1, wherein the RRC parameter includes a bitmap in which a first bit of the bitmap corresponds to a first PRB in the CFR.

12. A method for performing rate matching by a base station for user equipments (UEs), the method comprising:

transmitting, to the UEs, a group common-physical downlink shared channel (GC- PDSCH) for communications in a common frequency resource (CFR);

configuring at least one field of an information element, which carries configurations for a GC-PDSCH transmission in the CFR, to determine at least one parameter for determining a transport block size (TBS) for the GC-PDSCH transmission; and transmitting the information element to the UEs, wherein the information element includes a radio resource control (RRC) parameter that indicates reserved physical resource blocks (PRBs), per CFR, that are unavailable for PDSCH reception.

13. The method of claim 12, wherein the base station transmits, to the UEs, the GC-PDSCH transmission in the CFR and a unicast transmission.

14. The method of claim 12, wherein:

the information element is transmitted as part of RRC signaling;

the at least one parameter comprises at least one of a maximum number of multiple input-multiple output (MIMO) layers, a modulation and coding scheme (MCS) table, and an overhead parameter for the GC-PDSCH transmission in the CFR;

in case that the at least one field of the information element is not configured to determine the maximum number of MIMO layers, the maximum number of MIMO layers is predefined;

in case that the at least one field of the information element is not configured to determine the MCS table, a modulation order is set to a default modulation order value based on a standard MCS table for 64 quadrature amplitude modulation (QAM); and in case that the at least one field of the information element is not configured to determine the overhead parameter, the overhead parameter is set to a default overhead value.

15. The method of claim 12, further comprising:

configuring a CFR length for the GC-PDSCH transmission;

wherein a number of PRBs for determining limited buffer rate matching (LBRM) is determined based on a size of the CFR.

16. The method of claim 12, further comprising:

receiving, from a UE, a capabilities report indicating whether the UE supports different LBRM sizes between an initial GC-PDSCH transmission using a point-to-multipoint transmission scheme and a subsequent UE-specific PDSCH transmission using a point-to-point transmission scheme.

17. The method of claim 12, further comprising configuring one or more fields of the information element as indicating one or more rate matching patterns for the GC-PDSCH in the CFR, wherein the one or more rate matching patterns comprise resource elements that are not available to the UEs for the GC-PDSCH in the CFR.

18. The method of claim 17, further comprising configuring the one or more fields of the information element as indicating one or more rate matching pattern groups for the GC-PDSCH in the CFR, wherein the one or more rate matching pattern groups comprise grouped rate matching patterns other than the one or more rate matching patterns.

19. The method of claim 18, further comprising:

transmitting a group common-physical downlink control channel (GC-PDCCH) for communications in the CFR;

transmitting, to the UEs, a downlink control information (DCI) format in the GC-PDCCH in the CFR having the a first DCI format or a second DCI format, the second DCI format having a rate matching indicator field;

wherein the one or more rate matching patterns and the grouped rate matching patterns of the one or more rate matching pattern groups are applied for the GC-PDSCH in the CFR scheduled by the first DCI format; and wherein the one or more rate matching patterns are applied and the grouped rate matching patterns are selectively applied based on values of the rate matching indicator field for the GC-PDSCH in the CFR scheduled by the second DCI format.

20. A user equipment (UE) comprising:

a processor; and a non-transitory computer readable storage medium storing instructions that, when executed, cause the processor to:

receive a group common-physical downlink shared channel (GC-PDSCH) for communications in a common frequency resource (CFR);

receive an information element that carries configurations for a GC-PDSCH transmission in the CFR;

determine at least one parameter for determining a transport block size (TBS) for the GC-PDSCH transmission in the CFR from at least one field of the information element; and determine the TBS for the GC-PDSCH transmission in the CFR based on the at least one parameter, wherein the information element includes a radio resource control (RRC) parameter that indicates reserved physical resource blocks (PRBs), per CFR, that are unavailable for PDSCH reception.

21. A base station comprising:

a processor; and a non-transitory computer readable storage medium storing instructions that, when executed, cause the processor to:

transmit a group common-physical downlink shared channel (GC-PDSCH) for communications in a common frequency resource (CFR);

configure at least one field of an information element, which carries configurations for a GC-PDSCH transmission in the CFR, to determine at least one parameter for determining a transport block size (TBS) for the GC-PDSCH transmission in the CFR; and transmit the information element, wherein the information element includes a radio resource control (RRC) parameter that indicates reserved physical resource blocks (PRBs), per CFR, that are unavailable for PDSCH reception.

* * * * *